(12) United States Patent
Alvarino et al.

(10) Patent No.: US 10,306,441 B2
(45) Date of Patent: May 28, 2019

(54) TECHNIQUES FOR SUPPORTING A WIDER BAND MODE FOR ENHANCED MACHINE TYPE COMMUNICATION

(71) Applicant: QUALCOMM Incorporated, San Diego, CA (US)

(72) Inventors: Alberto Rico Alvarino, San Diego, CA (US); Wanshi Chen, San Diego, CA (US); Hao Xu, Beijing (CN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 15/642,244

(22) Filed: Jul. 5, 2017

(65) Prior Publication Data

US 2018/0014143 A1  Jan. 11, 2018

Related U.S. Application Data

(60) Provisional application No. 62/359,964, filed on Jul. 8, 2016.

(51) Int. Cl.
*H04W 4/70* (2018.01)
*H04L 5/00* (2006.01)
(Continued)

(52) U.S. Cl.
CPC ............. *H04W 4/70* (2018.02); *H04L 5/0048* (2013.01); *H04W 72/005* (2013.01);
(Continued)

(58) Field of Classification Search
CPC . H04W 4/70; H04W 72/005; H04W 72/0413; H04W 72/0453; H04W 72/048; H04W 88/06
See application file for complete search history.

(56) References Cited

U.S. PATENT DOCUMENTS 9,654,902 B2    5/2017  Oh et al.
2013/0114587 A1*  5/2013  Khoryaev ............. H04L 5/0094
                                                          370/343
(Continued)

FOREIGN PATENT DOCUMENTS

WO    WO2016164739 A1    10/2016
WO    WO2017026971 A1    2/2017

OTHER PUBLICATIONS

ISA/EP, International Search Report and Written Opinion of the International Searching Authority, Int'l Application No. PCT/US2017/040934, dated Oct. 9, 2017, European Patent Office, Rijswijk, NL, 17 pgs.

(Continued)

*Primary Examiner* — Mewale A Ambaye
(74) *Attorney, Agent, or Firm* — Holland & Hart LLP

(57) ABSTRACT

Techniques are described for wireless communication. A method for wireless communication at a wireless device includes transmitting an indication of a capability to operate according to a plurality of modes for communicating with a network on at least one shared channel in a connected mode. The plurality of modes include a narrowband mode and at least one wider band mode. Each wider band mode is based at least in part on a shared channel bandwidth between a narrowband shared channel bandwidth associated with the narrowband mode and a wideband shared channel bandwidth associated with a wideband mode. The method also includes receiving a shared channel assignment associated with operation in the narrowband mode or one of the at least one wider band mode, and communicating on a shared channel, when in the connected mode, in accordance with the received shared channel assignment.

54 Claims, 11 Drawing Sheets

(51) Int. Cl.
*H04W 72/00* (2009.01)
*H04W 72/04* (2009.01)
*H04W 88/06* (2009.01)

(52) U.S. Cl.
CPC ..... *H04W 72/048* (2013.01); *H04W 72/0413* (2013.01); *H04W 72/0453* (2013.01); *H04W 88/06* (2013.01)

(56) References Cited

U.S. PATENT DOCUMENTS

| | | |
|---|---|---|
| 2013/0301524 A1 | 11/2013 | Xu et al. |
| 2015/0156776 A1* | 6/2015 | Chen .................... H04W 72/02 370/329 |
| 2016/0295558 A1 | 10/2016 | Hussain et al. |
| 2017/0070991 A1 | 3/2017 | Subramanian et al. |

OTHER PUBLICATIONS

Sharp, "Frequency Allocation for M-PDCCH," 3GPP TSG RAN WG1 Meeting #82bis, R1-155563, Malmo, Sweden, Oct. 5-9, 2015, 3 pgs., XP051041713, 3rd Generation Partnership Project.

* cited by examiner

200

205 210

| UE DL Modes | UE UL Modes | UE Categories | Maximum supported bandwidth [in PRBs] |
|---|---|---|---|
| DL Category M1 | UL Category M1 | N/A | 6 |
| DL Category M1x3 | UL Category M1x3 | N/A | 16 |
| DL Category M1x5 | UL Category M1x5 | N/A | 25 |
| DL Category M1x10 | UL Category M1x10 | N/A | 50 |
| DL Category M1x20 | UL Category M1x20 | N/A | 100 |
| DL Category 0 | UL Category 0 | N/A | Maximum channel bandwidth specified per band in TS 36.101 |
| DL Category 6 | UL Category 5 | Category 6, 4 | |

FIG. 2

TECHNIQUES FOR SUPPORTING A WIDER BAND MODE FOR ENHANCED MACHINE TYPE COMMUNICATION

CROSS REFERENCES

The present application for Patent claims priority to U.S. Provisional Patent Application No. 62/359,964 by Rico Alvarino, et al., entitled "Techniques For Supporting A Wider Band Mode For Enhanced Machine Type Communication," filed Jul. 8, 2016, assigned to the assignee hereof.

BACKGROUND

Field of the Disclosure

The present disclosure, for example, relates to wireless communication systems, and more particularly to techniques for supporting a wider band mode for enhanced machine type communication (eMTC).

Description of Related Art

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system or LTE-Advanced (LTE-A) system). A wireless multiple-access communication system may include a number of base stations, each simultaneously supporting communication for multiple communication devices, which may be otherwise known as user equipment (UEs). A base station may communicate with UEs on downlink channels (e.g., for transmissions from a base station to a UE) and uplink channels (e.g., for transmissions from a UE to a base station).

Some types of UEs (e.g., narrowband UEs) may communicate with base stations or other UEs using narrowband communication. Narrowband communication may include, for example, narrowband LTE (NB-LTE) communication, machine-to-machine (M2M) communication (of which Machine Type Communication (MTC) or enhanced MTC (eMTC) may be considered a part for purposes of this disclosure), NB-Internet of Things (NB-IoT) communication, and the like. A narrowband transmission channel (e.g., a narrowband control channel or a narrowband data channel) may be associated with a narrower bandwidth than a wideband transmission channel, and may enable a narrowband UE to communicate using a potentially simpler and lower cost modem than is needed for communication over a wideband transmission channel. A narrowband modem may also consume less power than a wideband modem.

SUMMARY

The present disclosure, for example, relates to techniques for supporting a wider band mode for eMTC. Described techniques may also be used to provide a wider band mode for other types of narrowband communication.

Many narrowband wireless devices transmit only occasionally, transmit small amounts of data, and receive few downlink transmissions. However, some wireless devices may benefit from occasional (or more frequent) use of a wider band mode, which may be associated with a bandwidth (e.g., a channel bandwidth, such as a shared channel bandwidth) between a first bandwidth associated with a narrowband mode (e.g., an eMTC mode) and a second bandwidth associated with a wideband mode (e.g., a LTE/LTE-A mode). For example, a smart watch may send or receive occasional texts, or receive small bandwidth stock market updates, during normal use. At times, however, the smart watch may be used to play streaming music or download a music file or a video file. Such streaming or higher bandwidth operations may be performed on occasion, but may be performed with a better user experience (or better battery life) when performed while the smart watch is operating in a wider band mode. In some examples, a UE or network access device may select an operating mode for the UE from among a plurality of modes including a narrowband mode and at least one wider band mode. The selected mode may, in some examples, provide improved efficiencies or resource usage for the UE, for a user of the UE, or for a network access device.

In one example, a method for machine type communication at a wireless device is described. The method may include transmitting an indication of a capability to operate according to a plurality of modes for communicating with a network on at least one shared channel in a connected mode. The plurality of modes may include a narrowband mode and at least one wider band mode. Each wider band mode may be based at least in part on a shared channel bandwidth between a narrowband shared channel bandwidth associated with the narrowband mode and a wideband shared channel bandwidth associated with a wideband mode, with the narrowband shared channel bandwidth being different from the wideband shared channel bandwidth. The method may also include receiving a shared channel assignment associated with operation in the narrowband mode or one of the at least one wider band mode, and communicating on a shared channel, when in the connected mode, in accordance with the received shared channel assignment.

In one example, an apparatus for machine type communication at a wireless device is described. The apparatus may include a processor, and memory in electronic communication with the processor. The processor and the memory may be configured to transmit an indication of a capability to operate according to a plurality of modes for communicating with a network on at least one shared channel in a connected mode. The plurality of modes may include a narrowband mode and at least one wider band mode. Each wider band mode may be based at least in part on a shared channel bandwidth between a narrowband shared channel bandwidth associated with the narrowband mode and a wideband shared channel bandwidth associated with a wideband mode, with the narrowband shared channel bandwidth being different from the wideband shared channel bandwidth. The processor and the memory may also be configured to receive a shared channel assignment associated with operation in the narrowband mode or one of the at least one wider band mode, and to communicate on a shared channel, when in the connected mode, in accordance with the received shared channel assignment.

In one example, another apparatus for machine type communication at a wireless device is described. The apparatus may include means for transmitting an indication of a capability to operate according to a plurality of modes for communicating with a network on at least one shared channel in a connected mode. The plurality of modes may include a narrowband mode and at least one wider band mode. Each wider band mode may be based at least in part on a shared channel bandwidth between a narrowband shared channel bandwidth associated with the narrowband mode and a wideband shared channel bandwidth associated with a wideband mode, with the narrowband shared channel bandwidth being different from the wideband shared channel bandwidth. The apparatus may also include means for receiving a shared channel assignment associated with operation in the narrowband mode or one of the at least one wider band mode, and means for communicating on a shared channel, when in the connected mode, in accordance with the received shared channel assignment.

In one example, a non-transitory computer-readable medium storing computer-executable code for machine type wireless communication at a wireless device is described. The code may be executable by a processor to transmit an indication of a capability to operate according to a plurality of modes for communicating with a network on at least one shared channel in a connected mode. The plurality of modes may include a narrowband mode and at least one wider band mode. Each wider band mode may be based at least in part on a shared channel bandwidth between a narrowband shared channel bandwidth associated with the narrowband mode and a wideband shared channel bandwidth associated with a wideband mode, with the narrowband shared channel bandwidth being different from the wideband shared channel bandwidth. The code may also be executable by a processor to receive a shared channel assignment associated with operation in the narrowband mode or one of the at least one wider band mode, and to communicate on a shared channel, when in the connected mode, in accordance with the received shared channel assignment.

Some examples of the method, apparatus, and computer-readable medium described above may further include processes, features, means, instructions, or code for transitioning to the connected mode with the network, and for monitoring for the shared channel assignment based at least in part on transitioning to the connected mode with the network. In some of these examples, the monitoring for the shared channel assignment may include at least one of: monitoring at least one wideband grant for the shared channel assignment, in which each wideband grant is associated with the wideband mode; monitoring a subset of resource blocks allocated to the at least one wideband grant for the shared channel assignment; monitoring at least one wider band grant associated with the at least one wider band mode for the shared channel assignment; monitoring at least one wider band grant associated with a group of narrow bands for the shared channel assignment; or a combination thereof.

Some examples of the method, apparatus, and computer-readable medium described above may further include processes, features, means, instructions, or code for receiving, from the network, an indication to monitor for at least one shared channel assignment, and for monitoring for the shared channel assignment in accordance with the received indication to monitor for the at least one shared channel assignment. In some of these examples, the monitoring for the shared channel assignment may include at least one of: monitoring at least one wideband grant for the shared channel assignment, in which each wideband grant is associated with the wideband mode; monitoring a subset of resource blocks allocated to the at least one wideband grant for the shared channel assignment; monitoring at least one wider band grant associated with the at least one wider band mode for the shared channel assignment; monitoring at least one wider band grant associated with a group of narrow bands for the shared channel assignment; or a combination thereof.

In some examples of the method, apparatus, and computer-readable medium described above, the indicated capability to operate according to a plurality of modes for communicating with a network on at least one shared channel in a connected mode may include an indication of a maximum supported bandwidth of the wireless device, and the shared channel assignment may be associated with a mode having shared channel bandwidth that is less than or equal to the maximum supported bandwidth.

In some examples of the method, apparatus, and computer-readable medium described above, the receiving and the communicating may occur cross-subframe.

Some examples of the method, apparatus, and computer-readable medium described above may further include processes, features, means, instructions, or code for monitoring for the shared channel assignment in: narrowband grants and at least one of wider band grants or wideband grants, or narrowband grants in a common search space and at least one of wider band grants or wideband grants in a device-specific search space, or at least one of wider band grants or wideband grants.

Some examples of the method, apparatus, and computer-readable medium described above may further include processes, features, means, instructions, or code for receiving an indication of a frequency hopping associated with the shared channel assignment, the indication of the frequency hopping including at least one of: a frequency hopping offset based at least in part on a wider band associated with a wider band mode, a frequency hopping offset based at least in part on a number of resource blocks, an indication to use mirror hopping, an indication to use slot-based hopping for an uplink communication, or an indication to not use frequency hopping.

Some examples of the method, apparatus, and computer-readable medium described above may further include processes, features, means, instructions, or code for receiving at least one of: an indication of a non-contiguous resource allocation for a downlink communication, or an indication of a multi-cluster resource allocation for an uplink communication.

Some examples of the method, apparatus, and computer-readable medium described above may further include processes, features, means, instructions, or code for receiving a radio resource control (RRC) message indicating that semi-persistent scheduling (SPS) is activated for a mode of the plurality of modes.

Some examples of the method, apparatus, and computer-readable medium described above may further include processes, features, means, instructions, or code for receiving a RRC message indicating that SPS is activated, and for identifying a mode of the plurality of modes for which the SPS is activated based at least in part on: a maximum supported bandwidth of the wireless device, or the mode associated with the shared channel assignment.

Some examples of the method, apparatus, and computer-readable medium described above may further include processes, features, means, instructions, or code for identifying a subband including a narrow band used for transmission of a MTC physical downlink control channel (MPDCCH), the subband having a greater bandwidth than the narrow band used for the MPDCCH, and for transmitting channel state information (CSI) feedback for the identified subband when communicating in a first wider band mode.

Some examples of the method, apparatus, and computer-readable medium described above may further include processes, features, means, instructions, or code for identifying a subband associated with CSI feedback, the subband having a bandwidth between the narrowband shared channel bandwidth and the wideband shared channel bandwidth, and for transmitting CSI feedback for the identified subband when communicating in a first wider band mode.

Some examples of the method, apparatus, and computer-readable medium described above may further include processes, features, means, instructions, or code for receiving a system information block that identifies a first set of single cell point-to-multipoint (SC-PTM) resources associated with the narrowband mode, and a second set of SC-PTM resources associated with at least a first wider band mode.

Some examples of the method, apparatus, and computer-readable medium described above may further include processes, features, means, instructions, or code for receiving, in the system information block, a first indication of a first transport block size (TB S) associated with the first set of SC-PTM resources associated with the narrowband mode, and a second indication of a second TBS associated with the second set of SC-PTM resources associated with the first wider band mode.

Some examples of the method, apparatus, and computer-readable medium described above may further include processes, features, means, instructions, or code for receiving, in a MPDCCH, a first indication of a first TB S associated with the first set of SC-PTM resources associated with the narrowband mode, or a second indication of a second TBS associated with the second set of SC-PTM resources associated with the first wider band mode.

Some examples of the method, apparatus, and computer-readable medium described above may further include processes, features, means, instructions, or code for receiving an indication of at least one of: a first set of positioning reference symbols (PRS) for the narrowband mode, a second set of PRS for at least a first wider band mode, or a combination thereof.

In some examples of the method, apparatus, and computer-readable medium described above, the communicating may be based at least in part on a retuning from a first band to a second band, and the method, apparatus, or computer-readable medium may further include processes, features, means, instructions, or code for transmitting a sounding reference signal (SRS) when the first band and the second band are within a maximum supported bandwidth of the wireless device.

In some examples of the method, apparatus, and computer-readable medium described above, the at least one wider band mode may include a single wider band mode or a plurality of wider band modes. In some examples, the at least one wider band mode may include a first wider band mode and a second wider band mode, and the first wider band mode may be based at least in part on a different bandwidth than the second wider band mode. In some examples, the at least one wider band mode may include a wider band downlink shared channel bandwidth and a wider band uplink shared channel bandwidth that is different than the downlink shared channel bandwidth.

In some examples of the method, apparatus, and computer-readable medium described above, transmitting the indication of the capability to operate in the plurality of modes may include transmitting an indication of a maximum supported bandwidth of the wireless device. In some examples, the at least one shared channel may include at least one of a physical downlink shared channel (PDSCH), a physical uplink shared channel (PUSCH), or a combination thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same may be distinguished by following the reference label by a dash and a second label that distinguishes among the similar components. If just the first reference label is used in the specification, the description is applicable to any one of the similar components having the same first reference label irrespective of the second reference label.

FIG. 2 is an illustration of a plurality of modes in which a wireless device may operate, in accordance with various aspects of the present disclosure;

DETAILED DESCRIPTION

Described techniques relate to supporting a wider band mode for eMTC (or other types of narrowband communication). In some examples, a wireless device (e.g., a UE) may transmit an indication of a capability to operate in a plurality of modes when communicating with a network on at least one shared channel in a connected mode. The plurality of modes may include a narrowband mode and at least one wider band mode. Each wider band mode may be based at least in part on a bandwidth (e.g., a channel bandwidth, such as a shared channel bandwidth) between a first bandwidth associated with the narrowband mode and a second bandwidth associated with a wideband mode, with the first bandwidth being different from the second bandwidth. For example, the first bandwidth may be narrower than the second bandwidth. The wireless device may receive (e.g., from a network access device) a shared channel assignment associated with operations in the narrowband mode or a wider band mode. The wireless device may communicate on a shared channel, when in the connected mode, in accordance with the shared channel assignment.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
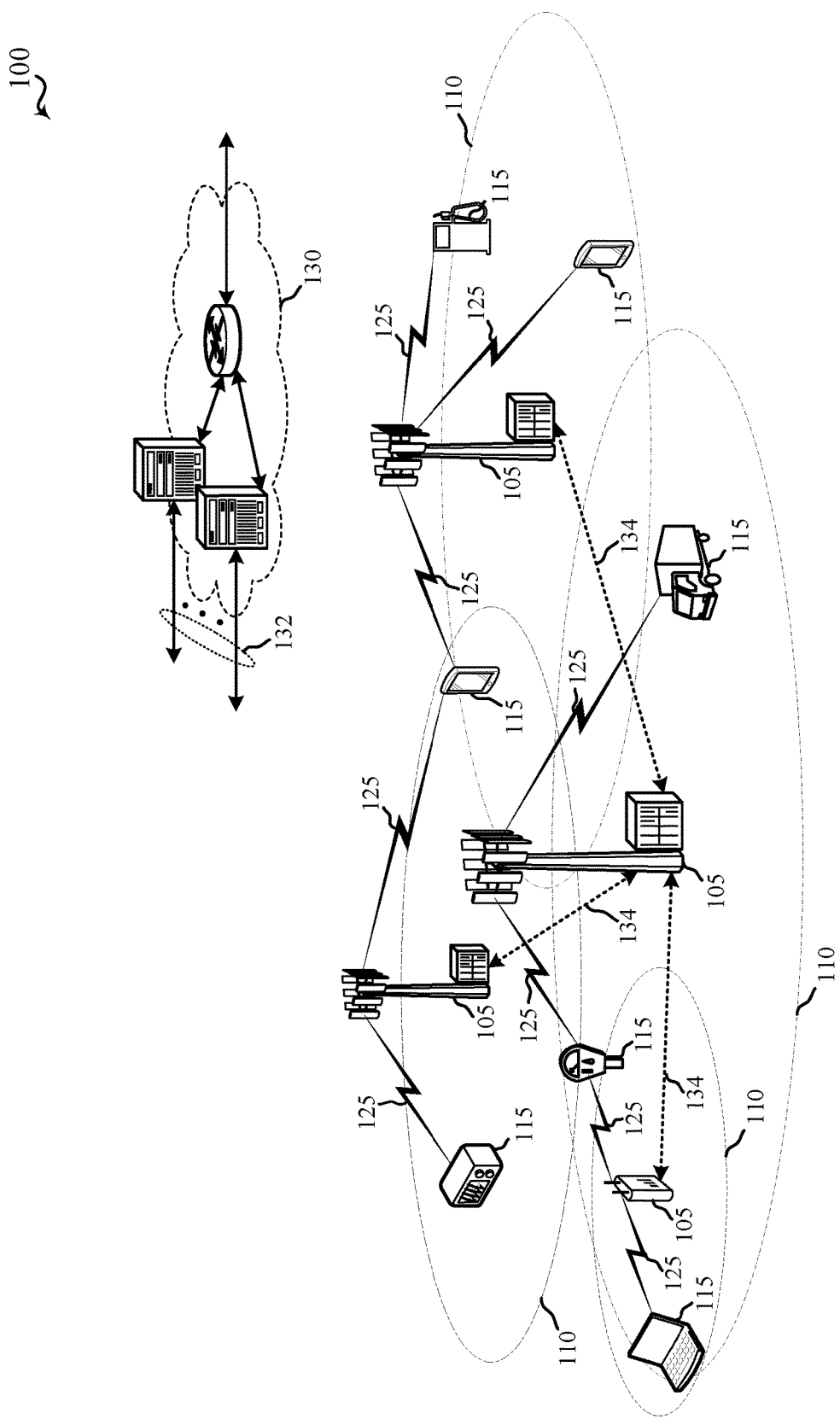
FIG. 1 shows an example of a wireless communication system, in accordance with various aspects of the present disclosure.

FIG. 1 shows an example of a wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X2, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors (not shown) making up a portion of the coverage area. The wireless communication system 100 may include base stations 105 of different types (e.g., macro or small cell base stations). There may be overlapping geographic coverage areas 110 for different technologies.

In some examples, the wireless communication system 100 may include an LTE/LTE-A network and may employ narrowband communication techniques. In LTE/LTE-A networks, the term evolved Node B (eNB) may be used to describe the base stations 105. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context. In some examples, the wireless communication system 100 may include a next generation or 5G network that employs narrowband communication techniques (in which case the base stations 105 may, in some examples, be replaced by access nodes including radio heads (e.g., smart radio heads) and access node controllers).

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a NB-LTE device, a M2M device, a MTC device, an eMTC device, a NB-IoT device or the like. A UE may be able to communicate with various types of base stations and network equipment, including macro eNBs, small cell eNBs, relay base stations, and the like.

The communication links 125 shown in wireless communication system 100 may include downlink (DL) channels, for transmissions from a base station 105 to a UE 115, or uplink (UL) channels, for transmissions from a UE 115 to a base station 105. The downlink channels may also be referred to as forward link channels, while the uplink channels may also be referred to as reverse link channels. The communication links 125 may include, for example, resources for wideband physical control channels (e.g., a PRACH, physical downlink control channel (PDCCH), enhanced PDCCH (ePDCCH), or physical uplink control channel (PUCCH)), wideband physical data channels (e.g., a physical downlink shared channel (PDSCH) or a physical uplink shared channel (PUSCH)), narrowband physical control channels (e.g., a narrowband PRACH, narrowband PDCCH (or a MTC downlink control channel (MPDCCH)), a narrowband ePDCCH, or a narrowband PUCCH), and narrowband physical data channels (e.g., a narrowband PDSCH or narrowband PUSCH). Using techniques described in the present disclosure, the communication links 125 may also include resources for wider band shared channels (e.g., a wider band PDSCH or wider band PUSCH). The wider band shared channels may be associated with channel bandwidths between a first bandwidth (e.g., a narrowband shared channel bandwidth) associated with a narrowband mode and a second bandwidth (e.g., a wideband shared channel bandwidth) associated with a wideband mode, with the first bandwidth being different from the second bandwidth.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency division duplexing (FDD) operation (e.g., using paired spectrum resources) or a time division duplexing (TDD) operation (e.g., using unpaired spectrum resources). Frame structures for FDD operation (e.g., frame structure type 1) and TDD operation (e.g., frame structure type 2) may be defined.

In some examples, a UE 115 operable as a narrowband wireless device (e.g., an eMTC wireless device) may be requested to perform tasks that may benefit from a larger transport block size (TBS) or greater channel bandwidth. For example, a narrowband wireless device (e.g., a smart watch) capable of supporting voice streaming, audio streaming, or another higher bandwidth application or scenario, may benefit from a greater PDSCH or PUSCH channel bandwidth when in a connected mode (e.g., eMTC coverage enhancement mode A (CE mode A)) with a network. Techniques described in the present disclosure may be used, when operating in a connected mode, to increase the channel bandwidth of a shared channel (e.g., a PDSCH or a PUSCH). In some examples, the techniques may not be applied to increase the channel bandwidth of non-shared channels (e.g., a MPDCCH) or channels transmitted when not operating in a connected mode (e.g., a random access channel or paging channel).

In some examples, a wireless device that is capable of receiving or transmitting a shared channel over a wider band may be configured to operate in one of a plurality of modes, with the modes including a narrowband mode (e.g., an eMTC mode) and at least one wider band mode (e.g., a further enhanced MTC mode (feMTC mode)). Each wider band mode may be based at least in part on a bandwidth (e.g., a wider band shared channel bandwidth) between a first bandwidth (e.g., a narrowband shared channel bandwidth) associated with the narrowband mode and a second bandwidth (e.g., a wideband shared channel bandwidth) associated with a wideband mode (e.g., a LTE/LTE-A mode). In some examples, a single wider band mode may be defined. In some examples, a plurality of wider band modes may be defined. In some examples, the plurality of wider band modes may include at least a first wider band mode and a second wider band mode, in which the first wider band mode is based at least in part on a different shared channel bandwidth than the second wider band mode. In some examples, the plurality of wider band modes may include at least a wider band downlink mode and a wider band uplink mode, in which the wider band downlink mode is based at least in part on a different shared channel bandwidth than the wider band uplink mode. In some examples, a wider band mode may be associated with a shared channel bandwidth of 5 MHz, or a bandwidth of 5-10 MHz.

FIG. 2 is an illustration 200 of a plurality of modes in which a wireless device may operate, in accordance with various aspects of the present disclosure. The plurality of modes include a plurality of downlink (DL) modes 205 and a plurality of uplink (UL) modes 210. The plurality of DL modes 205 may include a narrowband mode (e.g., a DL Category M1 mode associated with a shared channel bandwidth of 6 physical resource blocks (PRBs)), a wideband mode (e.g., a DL Category 0 mode associated with a maximum channel bandwidth (e.g., a maximum shared channel bandwidth per band specified in TS 36.101)), and a plurality of wider band DL modes (e.g., a DL Category M1×3 mode associated with a shared channel bandwidth of 15 PRBs, a DL Category M1×5 mode associated with a shared channel bandwidth of 25 PRBs, a DL Category M1×10 mode associated with a shared channel bandwidth of 50 PRBs, and a DL Category M1×20 mode associated with a shared channel bandwidth of 100 PRBs). The plurality of UL modes 210 may include a narrowband mode (e.g., a UL Category M1 mode associated with a shared channel bandwidth of 6 PRBs), a wideband mode (e.g., a UL Category 0 mode associated with a maximum channel bandwidth (e.g., a maximum shared channel bandwidth per band specified in TS 36.101)), and a plurality of wider band UL modes (e.g., a UL Category M1×3 mode associated with a shared channel bandwidth of 15 PRBs, a UL Category M1×5 mode associated with a shared channel bandwidth of 25 PRBs, a UL Category M1×10 mode associated with a shared channel bandwidth of 50 PRBs, and a UL Category M1×20 mode associated with a shared channel bandwidth of 100 PRBs). The plurality of DL modes 205 may also include a UE category wideband mode (e.g., a DL Category 6 mode), and the plurality of UL modes 210 may also include a UE category wideband mode (e.g., a UL Category 5 mode).

In some examples, a wireless device (e.g., a UE) may indicate (e.g., signal) to a network a capability to operate according to a plurality of modes. One of the plurality of modes may be used by the wireless device for communicating with a network, on at least one shared channel, in a connected mode. The plurality of modes may include a narrowband mode and at least one wider band mode. Each wider band mode may be based at least in part on a shared channel bandwidth between a narrowband shared channel bandwidth associated with the narrowband mode and a wideband shared channel bandwidth associated with a wideband mode. In some examples, the wireless device may indicate the capability to operate according to the plurality of modes when indicating other capabilities to the network. In some examples, indicating the capability to operate according to the plurality of modes may include indicating a maximum supported bandwidth of the wireless device, or indicating whether the wireless device is capable of operating in the plurality of modes (e.g., when only a single wider band mode is available).

In some examples, a wireless device may transition to a connected mode with a network, and may monitor for shared channel assignments (e.g., PDSCH assignments or PUSCH assignments) based at least in part on transitioning to the connected mode with the network. In some examples, a wireless device may receive, from a network, an indication to monitor for at least one shared channel assignment. The wireless device may then monitor for the shared channel assignment in accordance with the received indication. After receiving a shared channel assignment associated with operations in a narrowband mode or a wider band mode (e.g., one of the plurality of wider band modes indicated to the network), the wireless device may communicate on a shared channel, when in the connected mode, in accordance with the received shared channel assignment.

When a plurality of wider band modes are available, and when a wireless device indicates to a network a maximum supported bandwidth of the wireless device, the wireless device may receive, from a network access device (e.g., a base station or eNB), a shared channel assignment associated with a mode having a shared channel bandwidth that is less than or equal to the maximum supported bandwidth of the wireless device.

In some examples, a wireless device configured to operate in a wider band mode may receive cross-subframe scheduling information from a network. For example, a first subframe transmitted at time n may contain scheduling information for a second subframe transmitted at a time n+4. In some examples, a wireless device configured to operate in a narrowband mode may also receive cross-subframe scheduling information from a network.

An eMTC device may monitor narrowband grants (e.g., narrowband downlink grants or narrowband uplink grants, such as 6-0 grants and 6-1 grants, respectively, which may be communicated via a control channel having a narrowband control channel bandwidth, such as an MPDCCH) for narrowband assignments (e.g., narrowband downlink assignments or narrowband uplink assignments, which may be assignments associated with a narrowband shared channel bandwidth). The monitored narrowband grants may indicate narrowband indices and the resource blocks (RBs) inside a narrow band shared channel. But in some examples, narrowband grants may not be reused for wider band assignments.

Thus, in some examples, a wireless device may monitor for a narrowband or a wider band shared channel assignment by monitoring at least one wideband grant (e.g., a grant associated with LTE/LTE-A downlink control information (DCI) format 1A or DCI format 0) for the shared channel assignment. In some examples, a wireless device may monitor for a narrowband or a wider band shared channel assignment by monitoring a subset of resource blocks (RBs) allocated to at least one wideband grant (e.g., a grant associated with LTE/LTE-A DCI format 1A or DCI format 0) for the shared channel assignment. Each wideband grant may be associated with a wideband mode (e.g., associated with resources according to a wideband shared channel bandwidth), and may be communicated via a control channel having a narrowband control channel bandwidth, such as an MPDCCH having a bandwidth of 6 PRBs. Because a wideband grant associated with LTE/LTE-A DCI format 1A, for example, can schedule up to 100 RBs in 20 MHz, a network access device may transmit a shared channel assignment (or scheduling information related thereto) using one of a subset of scheduling possibilities provided by the wideband grant (e.g., ensuring that the total bandwidth used for scheduling a shared channel does not exceed the maximum supported bandwidth for the wireless device). When a network access device transmits a shared channel assignment (or scheduling information related thereto) using LTE/LTE-A DCI format 0, a HARQ number may need to be added as a result of uplink HARQ being asynchronous.

In some examples, a wireless device may monitor for a shared channel assignment by monitoring for at least one wider band grant (e.g., by monitoring a control channel having a wider band control channel bandwidth, or by monitoring a control channel having a narrowband control channel bandwidth, such as an MPDCCH) associated with the at least one wider band mode for the shared channel assignment (e.g., an assignment of shared channel resources according to a wider band shared channel bandwidth). In some examples, a wireless device may monitor for a shared channel assignment by monitoring a control channel having a narrowband control channel bandwidth for at least one wider band grant associated with a group (or union) of narrow bands for the wider band shared channel assignment. For example, a wider band grant for a wider band mode associated with a shared channel bandwidth of 12 RBs may be defined by a union of two 6 RB eMTC narrow bands.

In some examples, a wireless device may monitor for a shared channel assignment by monitoring for all possible bandlimited assignment possibilities.

An eMTC device may monitor narrowband grants (e.g., narrowband downlink grants or narrowband uplink grants, such as 6-1/6-0/6-1 grants) for narrowband assignments (e.g., narrowband downlink assignments or narrowband uplink assignments). In some examples, a wireless device may monitor for a shared channel assignment in narrowband grants (e.g., 6-0/1-A/B grants) and at least one of wider band grants (e.g., 7-0/1-A/B grants, or grants generally referred to as 6-0/1-A/B grants that otherwise identify that the resource allocation according to a device-specific (e.g., UE-specific) search space is a wider band resource allocation) or wideband grants. However, this may increase the number of blind decodings by the wireless device.

In some examples, a wireless device may monitor for a shared channel assignment in narrowband grants in a common search space, and in at least one of wider band grants or wideband grants in a device-specific (e.g., UE-specific) search space. In some examples both narrowband and wider band grants may be indicated by a control channel having a narrowband control channel bandwidth (e.g., an MPDCCH), and narrowband grants may be associated with a common search space and wider band grants may be associated with a device-specific (e.g., UE-specific) search space. In some cases, monitoring the narrowband grants in the common search space may be a fallback to monitoring the at least one of wider band grants or wideband grants in the device-specific (e.g., UE-specific) search space. For example, after an RRC reconfiguration that changes a configuration of the wider band grant, a UE may operate over some time during which the UE-specific search space is not stable (e.g., due to delay in applying the RRC reconfiguration). During this time, the UE and eNB may communicate by using the common search space. Accordingly, in some examples a wireless device may operate in a mode where the wireless device monitors only the at least one of wider band grants or wideband grants for a shared channel assignment until determining to operate according to a fallback position, in which case the wireless device may additionally or alternatively monitor narrowband grants in the common search space for a shared channel assignment.

In some examples, a wireless device may monitor for a shared channel assignment in at least one of wider band grants or wideband grant, and may not monitor narrowband grants at all. In these latter examples, a network access device may transmit a shared channel assignment associated with operation in a narrowband mode or a wider band mode using a wider band grant or a wideband grant.

An eMTC device may or may not employ frequency hopping for narrowband communication. In some examples, an eMTC device may employ frequency hopping based at least in part on an indication of frequency hopping received from a network access device. In some examples, the indication of frequency hopping may be received in a system information block (SIB), and may include a frequency hopping offset. The frequency hopping offset may be specified in terms of a number of narrow bands. Communications made in accordance with a wider band mode may also employ frequency hopping (or may not employ frequency hopping). For some wider band wireless devices, it may not be useful to signal a frequency hopping offset in terms of a number of narrow bands. Thus, in some examples, an indication of a frequency hopping associated with a shared channel assignment may include a frequency hopping offset based at least in part on a wider band associated with a wider band mode (e.g., a frequency hopping offset in terms of a number of wider bands), a frequency hopping offset based at least in part on a number of resource blocks (RBs), or an indication to use mirror hopping.

For downlink communications, and depending on the bandwidth of the downlink communications, retuning-based frequency hopping may not be useful. For example, retuning-based frequency hopping may not be useful when the maximum supported bandwidth for downlink communications to a wireless device is 10 MHz, and a cell's shared channel bandwidth is 15 MHz. In some examples, a network access device may indicate a non-contiguous resource allocation (e.g., non-contiguous RBs) for downlink communications instead of a frequency hopping for downlink communication.

For PUSCH communications, an indication of a frequency hopping associated with a shared channel assignment may include an indication to use slot-based hopping. In some examples, slot-based hopping for PUSCH may just be supported for small coverage levels (e.g., within the bandwidth of a wider band wireless device).

For uplink communications, an indication of a frequency hopping associated with a shared channel assignment may include an indication to use a multi-cluster resource allocation for an uplink communication. In some examples, the use of a multi-cluster resource allocation may depend on a wireless device's capability or maximum supported bandwidth. In some examples, multi-cluster resource allocation may be used instead of frequency hopping for a wireless device that supports multi-cluster resource allocation.

Semi-persistent scheduling (SPS) may or may not be used for an eMTC device. When SPS is used, SPS may be activated or deactivated based at least in part on scheduling information transmitted using DCI format 6-0/1-A, which scheduling information is scrambled with a SPS-radio network temporary identifier (SPS-RNTI). In some examples, SPS may be activated or deactivated for a wider band wireless device in an RRC message. The RRC message may indicate that SPS is activated or deactivated for a wider band mode or a narrowband mode, and a wireless device may monitor at least one grant associated with the wider band mode. Alternatively, and in some examples, a RRC message may indicate that SPS is activated or deactivated, and a wireless device may identify a mode for which SPS is activated (e.g., a wider band mode or a narrowband mode) based at least in part on a maximum supported bandwidth (e.g., by assuming SPS is activated or deactivated for a wider band mode associated with a shared channel bandwidth closest to, and equal to or less than, the maximum supported bandwidth. The mode for which SPS is activated (e.g., a wider band mode or a narrowband mode) may alternatively be identified by monitoring for shared channel assignments in grants associated with wider band modes and a narrowband mode, and identifying a mode associated with a shared channel assignment for the wireless device as the mode for which SPS is activated or deactivated.

CSI monitoring and measurement for eMTC devices is performed for MPDCCH narrow bands (i.e., having a control channel bandwidth of 6 RBs), which may be insufficient for wider band wireless devices. In some examples, one or more subbands may be defined for CSI monitoring and measurement when operating in a wider band mode.

Figure 3:
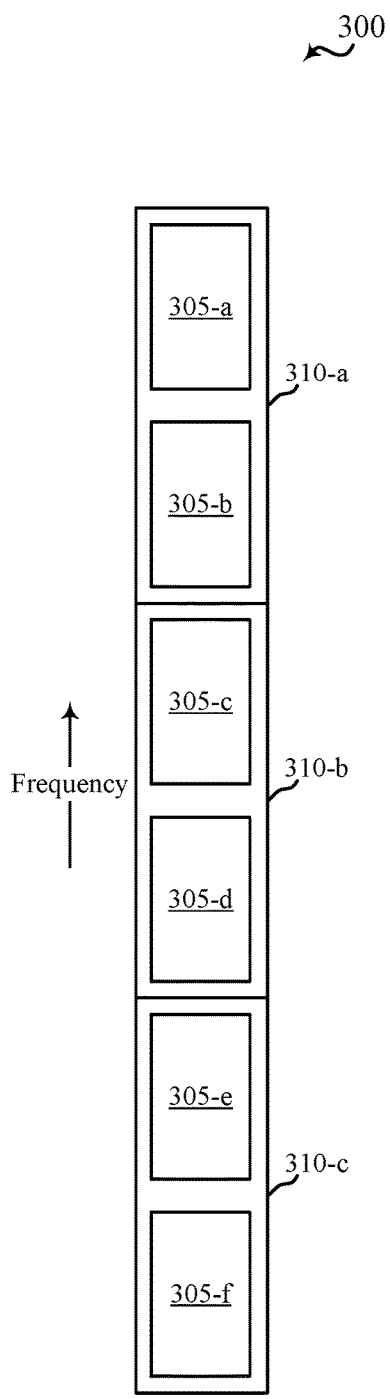
FIG. 3 shows a correspondence between a plurality of narrow bands and a plurality of wider bands, in accordance with various aspects of the present disclosure.

FIG. 3 shows a correspondence 300 between a plurality of narrow bands 305 and a plurality of wider bands 310, in accordance with various aspects of the present disclosure. By way of example, six narrow bands 305-a, 305-b, 305-c, 305-d, 305-e, and 305-f are shown. Also by way of example, three wider bands 310-a, 310-b, and 310-c are shown. Each wider band 310 includes two of the narrow bands 305. In some examples, each of the narrow bands 305 may be associated with a channel bandwidth of 6 RBs, and each of the wider bands 310 may be associated with a channel bandwidth of 12 RBs. In some examples, a wireless device may communicate in accordance with a narrowband mode via a channel on one of the narrow bands 305 or communicate in accordance with a wider band mode via a channel on one of the wider bands 310.

Figure 4:
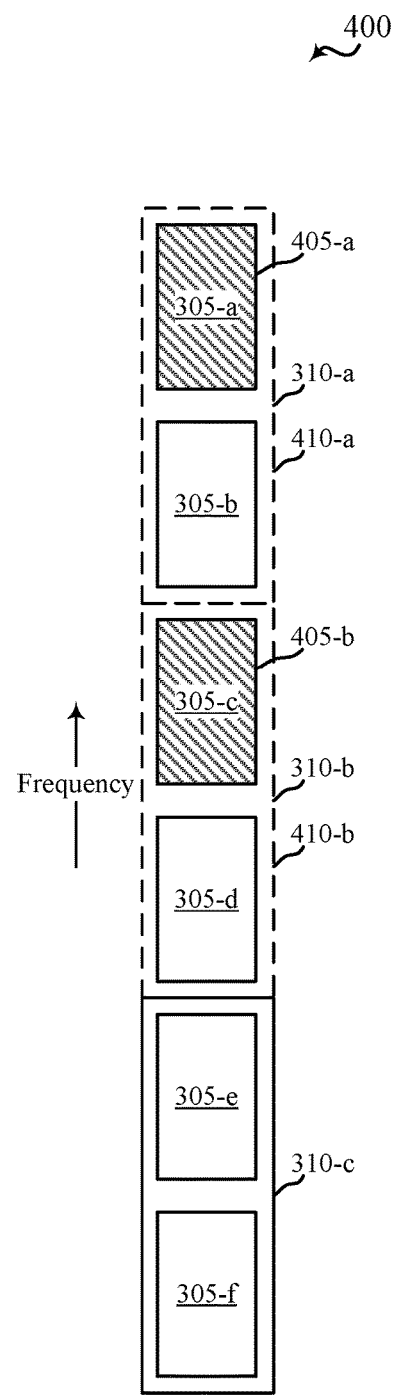
FIG. 4 shows a correspondence between a number of narrow bands that may be used for narrowband CSI monitoring and measurement, and a number of subbands that may be used for wider band CSI monitoring and measurement, in accordance with various aspects of the present disclosure.

FIG. 4 shows a correspondence 400 between a number of narrow bands 405 that may be used for narrowband CSI monitoring and measurement, and a number of subbands 410 that may be used for wider band CSI monitoring and measurement, in accordance with various aspects of the present disclosure. FIG. 4 also shows the narrow bands 305 and wider bands 310 described with reference to FIG. 3.

As shown in FIG. 4, the number of narrow bands 405 that may be used for narrowband CSI monitoring and measurement (e.g., a first narrow band 405-a or a second narrow band 405-b) include narrow bands 305 that may be used for transmission of a MPDCCH. Each of the subbands 410 that may be used for wider band CSI monitoring and measurement (e.g., a first subband 410-a or a second subband 410-b) includes at least one of the narrow bands 405 that may be used for narrowband CSI monitoring and measurement. A network access device or other network entity may define the subbands 410 by identifying the narrow bands 305 used for transmission of a MPDCCH, and defining the subbands 410 such that each subband 410 includes at least one of the narrow bands 305 used for transmission of a MPDCCH. A wireless device may identify one of the subbands 410 defined by the network, perform wider band CSI monitoring and measurement for the subband, and transmit wider band CSI feedback for the identified subband to the network. The transmission of wider band CSI feedback that includes narrowband CSI feedback for a MPDCCH provides the network with CSI feedback usable for assessment of a narrowband mode and a wider band mode.

In other examples, one or more subbands usable for wider band CSI monitoring and measurement may be defined without regard to the inclusion of a narrow band used for transmission of a MPDCCH.

In some examples, single cell point-to-multipoint (SC-PTM) transmissions may be supported by a wider band mode. In these examples, a network access device may transmit a system information block (SIB) that identifies two or more sets of SC-PTM resources, such as a first set of SC-PTM resources associated with a narrowband mode, and a second set of SC-PTM resources associated with a wider band mode. In some examples, a first transport block size (TBS) associated with the first set of SC-PTM resource and a second TBS associated with the second set of SC-PTM resources may be signaled in the SIB. For example, a first number of bits may signal 6 RBs associated with the first set of SC-PTM resources, and a second number of bits may signal 20 RBs associated with the second set of SC-PTM resources. Alternatively, the first TBS or second TBS may be signaled in a MPDCCH, with different size grants being made for the first set of SC-PTM resources and the second set of SC-PTM resources.

In some examples, a wider band mode may be allocated a set of positioning reference symbols (PRS) that differs from a set of PRS allocated for a narrowband mode. In some examples, a network access device may indicate, to a wireless device, a first set of PRS for a narrowband mode, a second set of PRS for a first wider band mode, possibly additional sets of PRS for other wider band modes, and/or a third set of PRS for a wideband mode. In some examples, a network access device may indicate which set of PRS a wireless device is to use. In some examples, a wireless device may select a set of PRS to use. In some examples, one or more sets of PRS may be signaled to a wireless device in a SIB.

An eMTC device may not transmit a sounding reference signal (SRS) when retuning from a first band to a second band is needed. In some examples, a wider band wireless device may also not transmit a SRS when retuning from a first band to a second band is needed. Alternatively, a wider band wireless device may, under some conditions, transmit a SRS when retuning from a first band to a second band would be needed for a narrowband wireless device. For example, a wider band wireless device may transmit a SRS when the first band and the second band are within a maximum supported bandwidth of the wireless device, but may not transmit a SRS when the first band and the second band are not within the maximum supported bandwidth of the wireless device.

Figure 5:
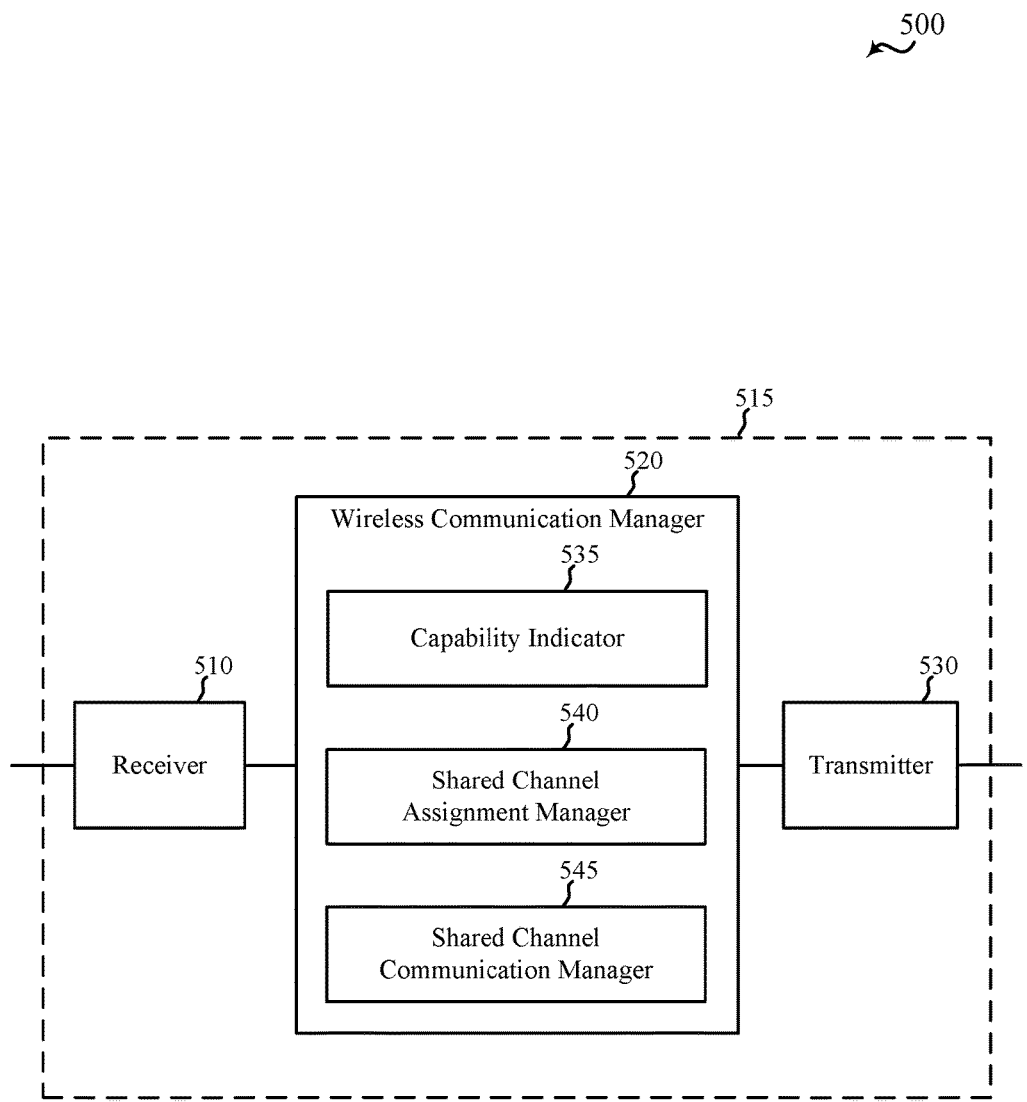
FIG. 5 shows a block diagram of an apparatus for use in wireless communication at a wireless device, in accordance with various aspects of the present disclosure.

FIG. 5 shows a block diagram 500 of an apparatus 515 for use in wireless communication at a wireless device, in accordance with various aspects of the present disclosure. The apparatus 515 may be an example of aspects of one or more of the UEs 115 described with reference to FIG. 1. The apparatus 515 may also be or include a processor. The apparatus 515 may include a receiver 510, a wireless communication manager 520, or a transmitter 530. Each of these components may be in communication with each other.

The components of the apparatus 515 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, Field Programmable Gate Arrays (FPGAs), a System on Chip (SoC), and/or others of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 510 may include at least one radio frequency (RF) receiver, such as at least one RF receiver operable to receive transmissions over a narrow band and at least one wider band, in which the wider band has a channel bandwidth between a first bandwidth (e.g., a narrowband channel bandwidth) associated with the narrowband mode and a second bandwidth (e.g., a wideband channel bandwidth) associated with a wideband mode. In some examples, one or more of the at least one radio frequency spectrum band may be used for narrowband communication such as eMTC communication. The receiver 510 may be used to receive various data or control signals (i.e., transmissions) over one or more communication links of a wireless communication system, such as one or more communication links of the wireless communication system 100 described with reference to FIG. 1.

In some examples, the transmitter 530 may include at least one RF transmitter, such as at least one RF transmitter operable to transmit over the narrow band and the at least one wider band. The transmitter 530 may be used to transmit various data or control signals (i.e., transmissions) over one or more communication links of a wireless communication system, such as one or more communication links of the wireless communication system 100 described with reference to FIG. 1.

In some examples, the wireless communication manager 520 may be used to manage one or more aspects of wireless communication for the apparatus 515. In some examples, part of the wireless communication manager 520 may be incorporated into or shared with the receiver 510 or the transmitter 530. In some examples, the wireless communication manager 520 may include a capability indicator 535, a shared channel assignment manager 540, or a shared channel communication manager 545.

The capability indicator 535 may be used to transmit (e.g., in cooperation with the transmitter 530) an indication of a capability (e.g., of the apparatus 515) to operate according to a plurality of modes for communicating with a network on at least one shared channel in a connected mode. The plurality of modes may include a narrowband mode and at least one wider band mode. Each wider band mode may be based at least in part on a shared channel bandwidth between a narrowband shared channel bandwidth associated with the narrowband mode and a wideband shared channel bandwidth associated with a wideband mode, in which the narrowband shared channel bandwidth is different from the wideband shared channel bandwidth. In some examples, transmitting the indication of the capability to operate according to the plurality of modes may include transmitting an indication of a maximum supported bandwidth of the wireless device. In some examples, the at least one shared channel may include at least one of a PDSCH, a PUSCH, or a combination thereof.

The shared channel assignment manager 540 may be used to receive (e.g., in cooperation with the receiver 510) a shared channel assignment associated with operation in the narrowband mode or operation in one of the at least one wider band mode.

The shared channel communication manager 545 may be used to communicate (e.g., in cooperation with the receiver 510 and/or the transmitter 530) on a shared channel, when in the connected mode, in accordance with the received shared channel assignment.

In some examples, the at least one wider band mode may include a single wider band mode or, alternatively, a plurality of wider band modes. In some examples in which the at least one wider band mode includes a plurality of wider band modes, the plurality of wider band modes may include a first wider band mode and a second wider band mode, with the first wider band mode being based at least in part on a different shared channel bandwidth than the second wider band mode. In some examples in which the at least one wider band mode includes a plurality of wider band modes, the plurality of wider band modes may include a wider band downlink mode and a wider band uplink mode, with the wider band downlink mode being based at least in part on a different shared channel bandwidth than the wider band uplink mode.

In some examples, the capability to operate according to the plurality of modes, as indicated by the capability indicator 535, may include an indication of a maximum supported bandwidth of the apparatus 515, and the shared channel assignment may be associated with a mode having maximum shared channel bandwidth that is less than or equal to the maximum supported bandwidth.

In some examples, the receiving and communicating operations performed by the shared channel assignment manager 540 and the shared channel communication manager 545 may occur cross-subframe (e.g., the communications managed by the shared channel communication manager 545 may be cross-subframe scheduled).

Figure 6:
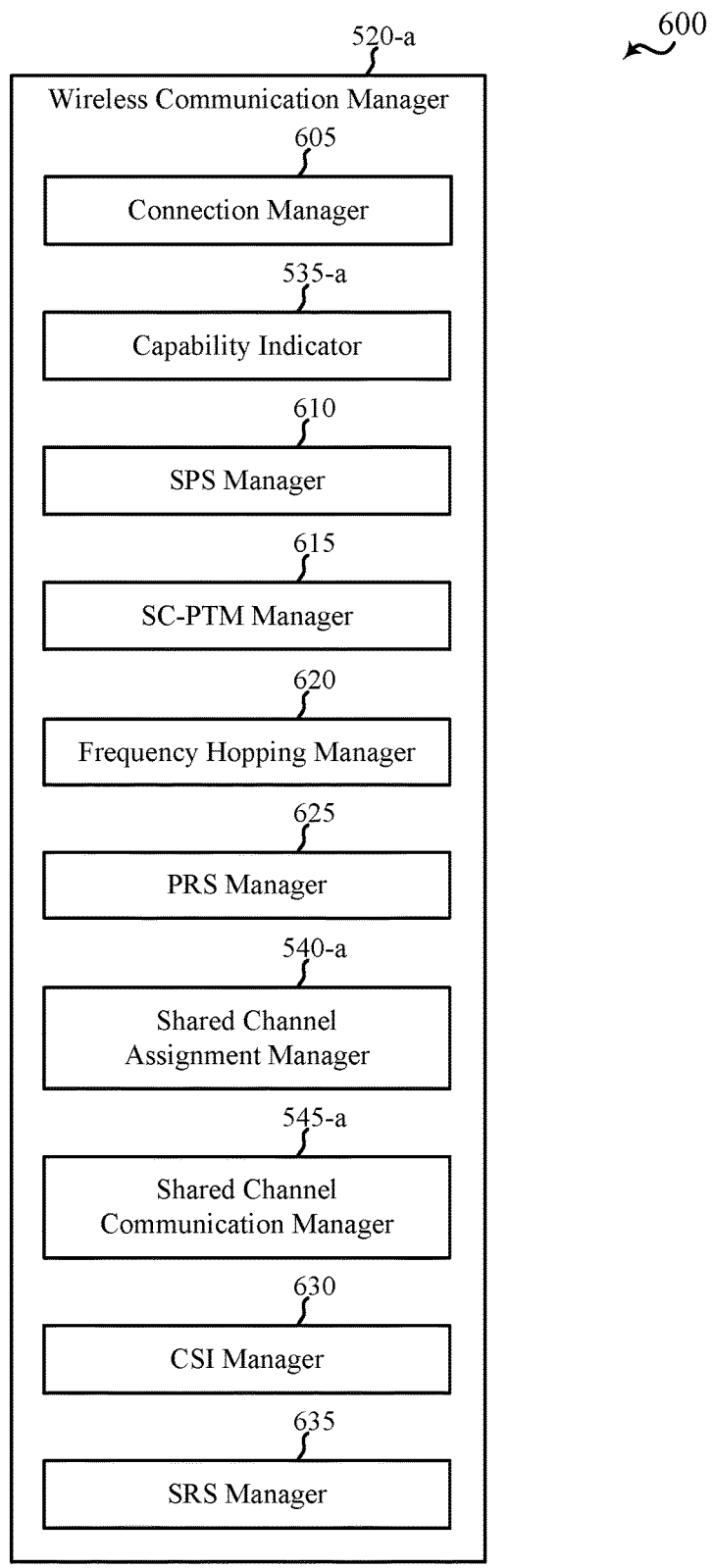
FIG. 6 shows a block diagram of a wireless communication manager for use in wireless communication, in accordance with various aspects of the present disclosure.

FIG. 6 shows a block diagram 600 of a wireless communication manager 520-a for use in wireless communication, in accordance with various aspects of the present disclosure. The wireless communication manager 520-a may be an example of aspects of the wireless communication manager 520 described with reference to FIG. 5.

The components of the wireless communication manager 520-a may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 520-a may be used to manage one or more aspects of wireless communication for a UE, wireless device, or apparatus, such as one of the UEs 115 described with reference to FIG. 1, or one of the apparatus 515 described with reference to FIG. 5. In some examples, part of the wireless communication manager 520-a may be incorporated into or shared with a receiver or a transmitter (e.g., the receiver 510 or the transmitter 530 described with reference to FIG. 5). In some examples, the wireless communication manager 520-a may include a connection manager 605, a capability indicator 535-a, a SPS manager 610, a SC-PTM manager 615, a frequency hopping manager 620, a PRS manager 625, a shared channel assignment manager 540-a, a shared channel communication manager 545-a, a CSI manager 630, or a SRS manager 635.

The connection manager 605 may be used to transition a wireless device to (or from) a connected mode with a network. When the wireless device does not need to be in a connected mode, the connection manager 605 may transition the wireless device to an idle mode (e.g., for power saving).

The capability indicator 535-a may be used to transmit (e.g., in cooperation with a transmitter 530) an indication of a capability (of a wireless device or apparatus including the wireless communication manager 520-a) to operate in a plurality of modes when communicating with a network on at least one shared channel in a connected mode. The plurality of modes may include a narrowband mode and at least one wider band mode. Each wider band mode may be based at least in part on a shared channel bandwidth between a narrowband shared channel bandwidth associated with the narrowband mode and a wideband shared channel bandwidth associated with a wideband mode, in which the narrowband shared channel bandwidth is different from the wideband shared channel bandwidth. In some examples, transmitting the indication of the capability to operate in the plurality of modes may include transmitting an indication of a maximum supported bandwidth of the wireless device. In some examples, the at least one shared channel may include at least one of a PDSCH, a PUSCH, or a combination thereof.

The SPS manager 610 may be used to receive (e.g., in cooperation with a receiver 510) an indication that SPS is activated or deactivated for a mode of the plurality of modes. In some examples, a received RRC message may just indicate that SPS is activated, and the SPS manager 610 may identify a mode of the plurality of modes for which the SPS is activated based at least in part on a maximum supported bandwidth of the wireless device that includes the wireless communication manager 520-a, or based at least in part on a mode associated with a shared channel assignment received by the shared channel assignment manager 540-a.

The SC-PTM manager 615 may be used to receive (e.g., in cooperation with a receiver 510) at least one indication of SC-PTM resources. In some examples, the at least one indication of SC-PTM resources may be received with system information (e.g., in at least one SIB). In some examples, the SC-PTM manager 615 may receive at least one indication of SC-PTM resources in at least one SIB that identifies a first set of SC-PTM resources associated with the narrowband mode, and a second set of SC-PTM resources associated with at least a first wider band mode. In some examples, the SC-PTM manager 615 may receive, in the at least one SIB, a first indication of a first TBS associated with the first set of SC-PTM resources associated with the narrowband mode, and a second indication of a second TBS associated with the second set of SC-PTM resources associated with the first wider band mode.

The frequency hopping manager 620 may be used to receive (e.g., in cooperation with a receiver 510) an indication of a frequency hopping associated with a shared channel assignment. The indication of the frequency hopping may include at least one of: a frequency hopping offset based at least in part on a wider band associated with a wider band mode, a frequency hopping offset based at least in part on a number of resource blocks, an indication to use mirror hopping, an indication to use slot-based hopping for an uplink communication, or an indication to not use frequency hopping. In some examples, the indication of the frequency hopping associated with the shared channel assignment may be received in a SIB.

The PRS manager 625 may be used to receive (e.g., in cooperation with a receiver 510) an indication of at least one of: a first set of PRS for the narrowband mode, a second set of PRS for at least a first wider band mode, or a combination thereof. In some examples, the indication(s) of the set(s) of PRS may be received in a SIB.

The shared channel assignment manager 540-a may be used to monitor (e.g., in cooperation with a receiver 510) for a shared channel assignment based at least in part on transitioning to the connected mode with the network, or based at least in part on receiving, from the network, an indication to monitor for at least one shared channel assignment. In some examples, monitoring for a shared channel assignment may include at least one of: monitoring at least one wideband grant for the shared channel assignment, in which each wideband grant is associated with the wideband mode; monitoring a subset of RBs allocated to the at least one wideband grant for the shared channel assignment; monitoring at least one wider band grant associated with the at least one wider band mode for the shared channel assignment; monitoring at least one wider band grant associated with a group of narrow bands for the shared channel assignment; or a combination thereof.

The shared channel assignment manager 540-a may also be used to receive a shared channel assignment associated with operation in the narrowband mode or operation in a wider band mode. In some examples, receiving the shared channel assignment may include receiving at least one of: an indication of a non-contiguous resource allocation for a downlink communication, or an indication of a multi-cluster resource allocation for an uplink communication. In some examples, receiving the shared channel assignment may include receiving, in a MPDCCH, a first indication of a first TB S associated with the first set of SC-PTM resources associated with the narrowband mode, or a second indication of a second TBS associated with the second set of SC-PTM resources associated with the first wider band mode.

The shared channel communication manager 545-a may be used to communicate (e.g., in cooperation with a receiver 510 and/or a transmitter 530) on a shared channel, when in the connected mode, in accordance with the shared channel assignment.

The CSI manager 630 may be used to identify a subband associated with CSI feedback. In some examples, the subband may include a narrow band used for transmission of a MPDCCH, but the subband may have a greater bandwidth than the narrow band (e.g., the narrowband control channel bandwidth) used for the MPDCCH. In some examples, the subband may have a third bandwidth between the narrowband shared channel bandwidth of the narrowband mode and the wideband shared channel bandwidth of the wideband mode. The CSI manager 630 may also be used to transmit CSI feedback for the identified subband (e.g., when communicating in a first wider band mode). Alternatively, when communicating in the narrowband mode, the CSI manager 630 may transmit CSI feedback for a narrow band used for transmission of a MPDCCH. The CSI feedback may be transmitted on a shared channel (e.g., on a PUSCH), or alternatively may be transmitted on a control channel (e.g., on a MPDCCH or PUCCH).

The SRS manager 635 may be used to transmit (e.g., in cooperation with a transmitter 530) a SRS. When the communications managed by the shared channel communication manager 545-a are based at least in part on a retuning from a first band to a second band, the SRS manager 635 may transmit a SRS when the first band and the second band are within a maximum supported bandwidth of the wireless device.

Figure 7:
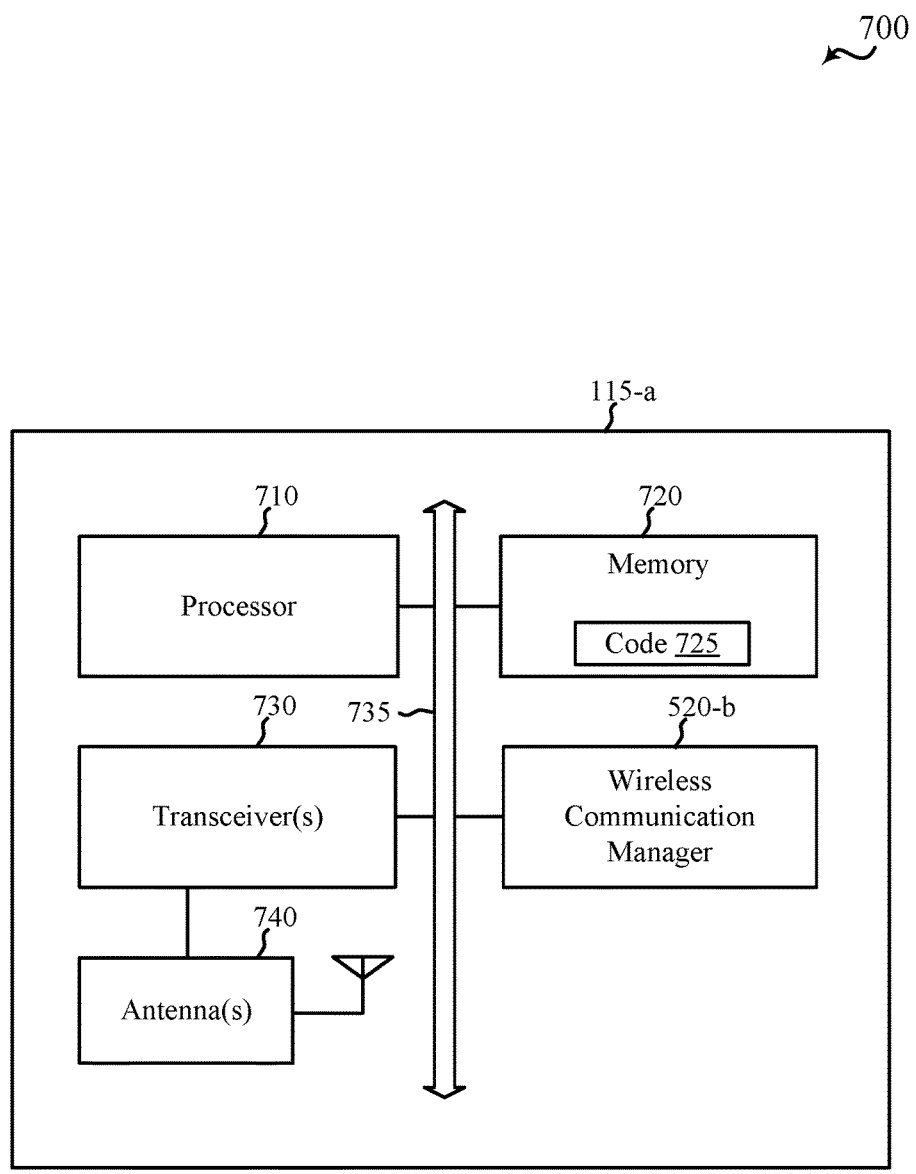
FIG. 7 shows a block diagram of a UE for use in wireless communication, in accordance with various aspects of the present disclosure.

FIG. 7 shows a block diagram 700 of a UE 115-a for use in wireless communication, in accordance with various aspects of the present disclosure. The UE 115-a may be included in or be part of a wearable device (e.g., a watch or monitoring device), a tracking device, an ID tag, a household device, a monitoring device, etc. The UE 115-a may, in some examples, have an internal power supply (not shown), such as a small battery, to facilitate mobile or remote operation. In some examples, the UE 115-a may be an example of aspects of one or more of the UEs 115 described with reference to FIG. 1, or aspects of the apparatus 515 described with reference to FIG. 5. The UE 115-a may be configured to implement at least some of the UE or apparatus techniques and functions described with reference to FIG. 1, 2, 3, 4, 5, or 6.

The UE 115-a may include a processor 710, a memory 720, at least one transceiver (represented by transceiver(s) 730, which may be an example of a receiver 510 and a transmitter 530 described with reference to FIG. 5), at least one antenna (represented by antenna(s) 740), or a wireless communication manager 520-b. Each of these components may be in communication with each other, directly or indirectly, over one or more buses 735.

The memory 720 may include random access memory (RAM) or read-only memory (ROM). The memory 720 may store computer-readable, computer-executable code 725 containing instructions that are configured to, when executed by the processor 710, cause the UE 115-a to perform various functions described herein related to wireless communication, including, for example, transmitting an indication of a capability to operate according to a plurality of modes for communicating with a network on at least one shared channel in a connected mode, in which the plurality of modes include a narrowband mode and at least one wider band mode, and in which each wider band mode is based at least in part on a bandwidth between a narrowband shared channel bandwidth associated with the narrowband mode and a wideband shared channel bandwidth associated with a wideband mode; receiving a shared channel assignment associated with operation in the narrowband mode or one of the at least one wider band mode; and communicating on a shared channel, when in the connected mode, in accordance with the received shared channel assignment. Alternatively, the computer-executable code 725 may not be directly executable by the processor 710 but be configured to cause the UE 115-*a* (e.g., when compiled and executed) to perform various of the functions described herein.

The processor 710 may include an intelligent hardware device, e.g., a central processing unit (CPU), a microcontroller, an ASIC, etc. The processor 710 may process information received through the transceiver(s) 730 or information to be sent to the transceiver(s) 730 for transmission through the antenna(s) 740. The processor 710 may handle, alone or in connection with the wireless communication manager 520-*b*, various aspects of communicating over (or managing communications over) one or more radio frequency spectrum bands in one or more of a plurality of modes.

The transceiver(s) 730 may include at least one modem configured to modulate packets and provide the modulated packets to the antenna(s) 740 for transmission, and to demodulate packets received from the antenna(s) 740. The transceiver(s) 730 may, in some examples, be implemented as one or more transmitters and one or more separate receivers. The transceiver(s) 730 may support communications in one or more spectrums using one or more radio access technologies. The transceiver(s) 730 may be configured to communicate bi-directionally, via the antenna(s) 740, with one or more network access devices, such as one or more of the base stations 105 described with reference to FIG. 1. While the UE 115-*a* may include a single antenna, there may be examples in which the UE 115-*a* may include multiple antennas.

The wireless communication manager 520-*b* may be configured to perform or control some or all of the UE, apparatus, or wireless device techniques or functions described with reference to FIG. 1, 2, 3, 4, 5, or 6 related to wireless communication in one or more of a plurality of modes. The wireless communication manager 520-*b*, or portions of it, may include a processor, or some or all of the functions of the wireless communication manager 520-*b* may be performed by the processor 710 or in connection with the processor 710. In some examples, the wireless communication manager 520-*b* may be an example of aspects of the wireless communication managers 520 described with reference to FIG. 5 or 6.

Figure 8:
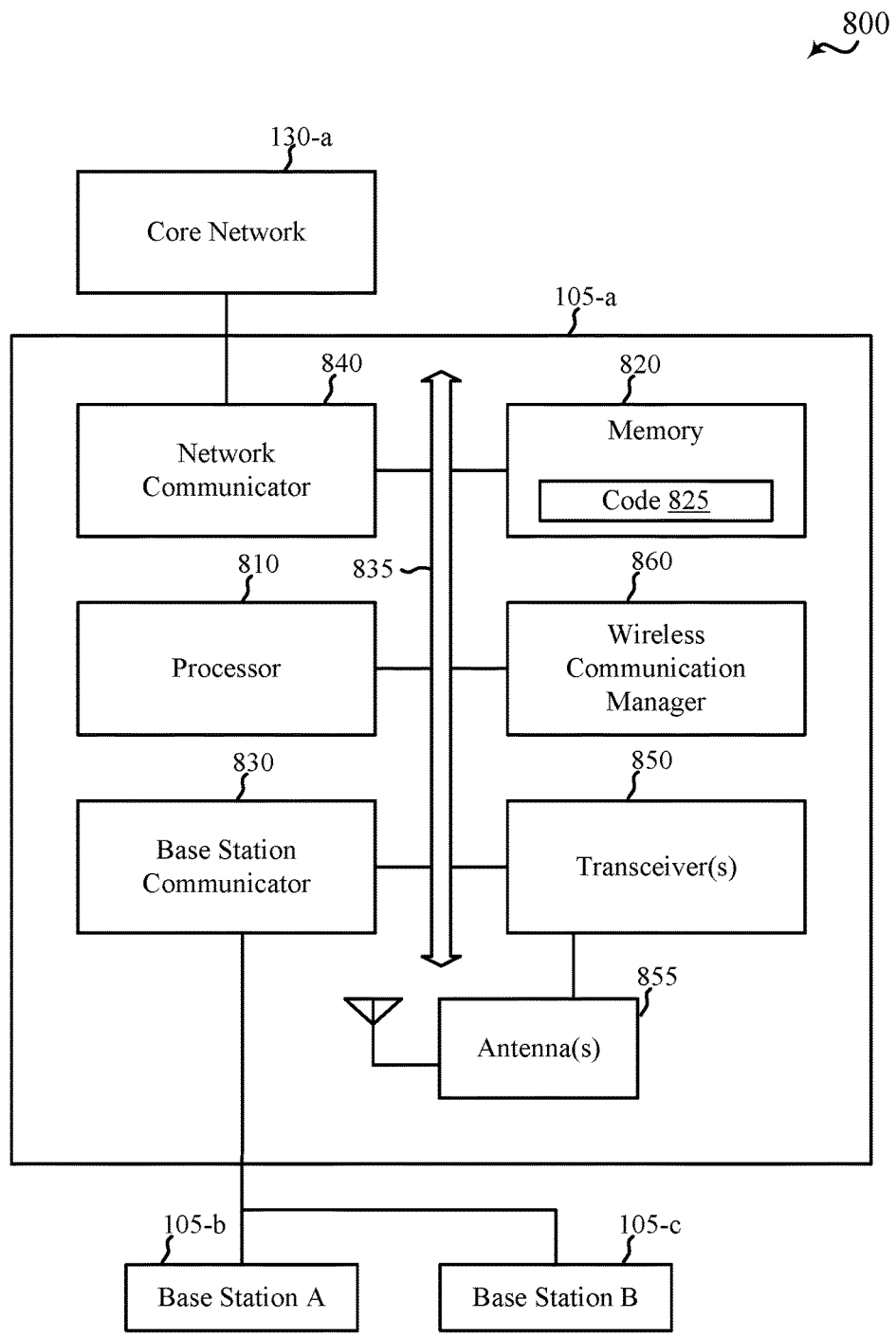
FIG. 8 shows a block diagram of a base station for use in wireless communication, in accordance with various aspects of the present disclosure.

FIG. 8 shows a block diagram 800 of a base station 105-*a* (e.g., a base station forming part or all of an eNB) for use in wireless communication, in accordance with various aspects of the present disclosure. In some examples, the base station 105-*a* may be an example of aspects of one or more of the base stations 105 described with reference to FIG. 1. The base station 105-*a* may be configured to implement or facilitate at least some of the base station or network access device features and functions described with reference to FIG. 1, 2, 3, 4, 5, or 6.

The base station 105-*a* may include a processor 810, a memory 820, at least one transceiver (represented by transceiver(s) 850), at least one antenna (represented by antenna(s) 855), or a base station wireless communication manager 860. The base station 105-*a* may also include one or more of a base station communicator 830 or a network communicator 840. Each of these components may be in communication with each other, directly or indirectly, over one or more buses 835.

The memory 820 may include RAM or ROM. The memory 820 may store computer-readable, computer-executable code 825 containing instructions that are configured to, when executed, cause the processor 810 to perform various functions described herein related to wireless communication, including, for example, configuring a wireless device to communicate on a shared channel in a narrowband mode or a wider band mode, as described in FIG. 1, 2, 3, 4, 5, or 6. Alternatively, the computer-executable code 825 may not be directly executable by the processor 810 but be configured to cause the base station 105-*a* (e.g., when compiled and executed) to perform various of the functions described herein.

The processor 810 may include an intelligent hardware device, e.g., a CPU, a microcontroller, an ASIC, etc. The processor 810 may process information received through the transceiver(s) 850, the base station communicator 830, or the network communicator 840. The processor 810 may also process information to be sent to the transceiver(s) 850 for transmission through the antenna(s) 855, to the base station communicator 830, for transmission to one or more other base stations (e.g., the base station 105-*b* or the base station 105-*c*), or to the network communicator 840 for transmission to a core network 130-*a*, which may be an example of one or more aspects of the core network 130 described with reference to FIG. 1. The processor 810 may handle, alone or in connection with the base station wireless communication manager 860, various aspects of communicating over (or managing communications over) one or more radio frequency spectrum bands in one or more of a plurality of modes.

The transceiver(s) 850 may include a modem configured to modulate packets and provide the modulated packets to the antenna(s) 855 for transmission, and to demodulate packets received from the antenna(s) 855. The transceiver(s) 850 may, in some examples, be implemented as one or more transmitters and one or more separate receivers. The transceiver(s) 850 may support communication over one or more wireless communication links. The transceiver(s) 850 may be configured to communicate bi-directionally, via the antenna(s) 855, with one or more UEs, wireless devices, or other apparatuses, such as one or more of the UEs 115 described with reference to FIG. 1 or 7, or one or more of the apparatus 515 described with reference to FIG. 5. The base station 105-*a* may, for example, include multiple antennas (e.g., an antenna array). The base station 105-*a* may communicate with the core network 130-*a* through the network communicator 840. The base station 105-*a* may also communicate with other base stations, such as the base station 105-*b* or the base station 105-*c*, using the base station communicator 830.

The base station wireless communication manager 860 may be configured to perform or control some or all of the base station or network access device techniques or functions described with reference to FIG. 1, 2, 3, 4, 5, or 6 related to wireless communication in one or more of a plurality of modes. The base station wireless communication manager 860, or portions of it, may include a processor, or some or all of the functions of the base station wireless communication manager 860 may be performed by the processor 810 or in connection with the processor 810.

Figure 9:
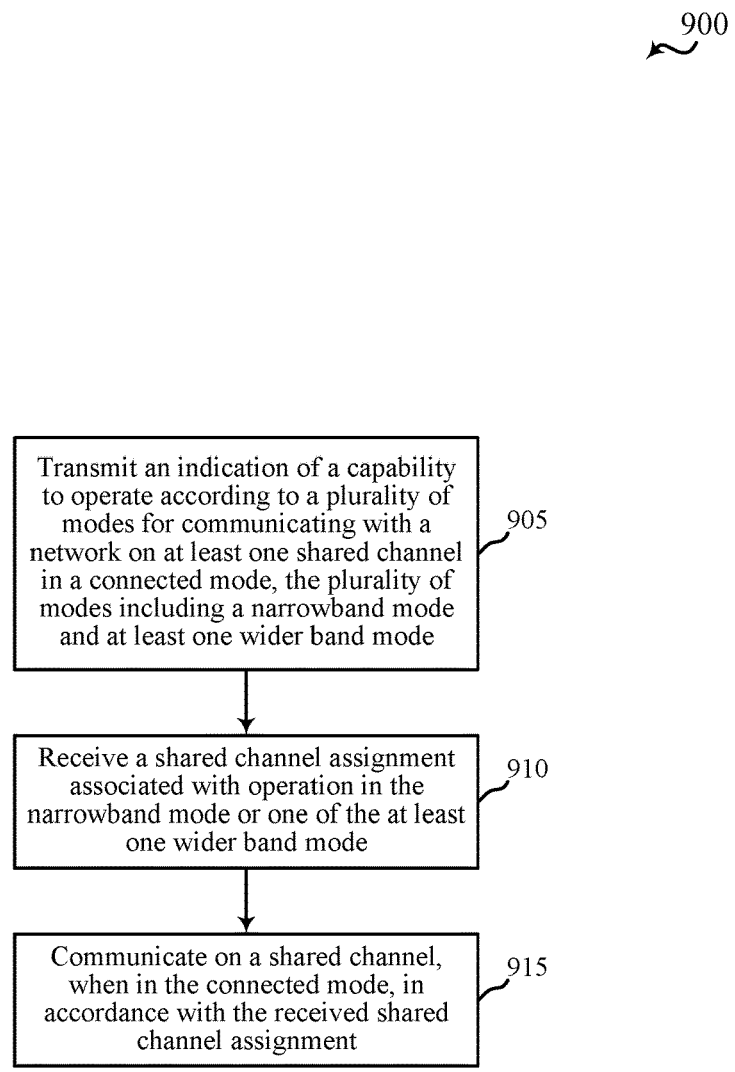
FIG. 9 is a flow chart illustrating an example of a method for wireless communication at a wireless device, in accordance with various aspects of the present disclosure.

FIG. 9 is a flow chart illustrating an example of a method 900 for wireless communication at a wireless device, in accordance with various aspects of the present disclosure. For clarity, the method 900 is described below with reference to aspects of one or more of the UEs 115 described with reference to FIG. 1 or 7, aspects of the apparatus 515 described with reference to FIG. 5, or aspects of one or more of the wireless communication managers 520 described with reference to FIG. 5, 6, or 7. In some examples, a wireless device may execute one or more sets of codes to control the functional elements of the wireless device to perform the functions described below. Additionally or alternatively, the wireless device may perform one or more of the functions described below using special-purpose hardware.

At block 905, the method 900 may include transmitting an indication of a capability to operate according to a plurality of modes for communicating with a network on at least one shared channel in a connected mode. The plurality of modes may include a narrowband mode and at least one wider band mode. Each wider band mode may be based at least in part on a shared channel bandwidth between a narrowband shared channel bandwidth associated with the narrowband mode and a wideband shared channel bandwidth associated with a wideband mode, in which the narrowband shared channel bandwidth is different from the wideband shared channel bandwidth. In some examples, transmitting the indication of the capability to operate in the plurality of modes may include transmitting an indication of a maximum supported bandwidth of the wireless device. In some examples, the at least one shared channel may include at least one of a PDSCH, a PUSCH, or a combination thereof. The operation(s) at block 905 may be performed using the wireless communication manager 520 described with reference to FIG. 5, 6, or 7, or the capability indicator 535 described with reference to FIG. 5 or 6, which may operate in cooperation with a transmitter 530 described with reference to FIG. 5.

At block 910, the method 900 may include receiving a shared channel assignment associated with operation in the narrowband mode or operation in one of the at least one wider band mode. The operation(s) at block 910 may be performed using the wireless communication manager 520 described with reference to FIG. 5, 6, or 7, or the shared channel assignment manager 540 described with reference to FIG. 5 or 6, which may operate in cooperation with a receiver 510 described with reference to FIG. 5.

At block 915, the method 900 may include communicating on a shared channel, when in the connected mode, in accordance with the received shared channel assignment. The operation(s) at block 915 may be performed using the wireless communication manager 520 described with reference to FIG. 5, 6, or 7, or the shared channel communication manager 545 described with reference to FIG. 5 or 6, which may operate in cooperation with a receiver 510 and/or a transmitter 530 described with reference to FIG. 5.

In some examples of the method 900, the at least one wider band mode may include a single wider band mode or, alternatively, a plurality of wider band modes. In some examples in which the at least one wider band mode includes a plurality of wider band modes, the plurality of wider band modes may include a first wider band mode and a second wider band mode, with the first wider band mode being based at least in part on a different shared channel bandwidth than the second wider band mode. In some examples in which the at least one wider band mode includes a plurality of wider band modes, the plurality of wider band modes may include a wider band downlink mode and a wider band uplink mode, with the wider band downlink mode being based at least in part on a different shared channel bandwidth than the wider band uplink mode.

In some examples of the method 900, the indicated capability to operate according to a plurality of modes may include an indication of a maximum supported bandwidth of the wireless device, and the shared channel assignment may be associated with a mode having maximum shared channel bandwidth that is less than or equal to the maximum supported bandwidth.

In some examples of the method 900, the receiving and communicating operations at blocks 910 and 915 may occur cross-subframe (e.g., the communications at block 915 may be cross-subframe scheduled).

Figure 10:
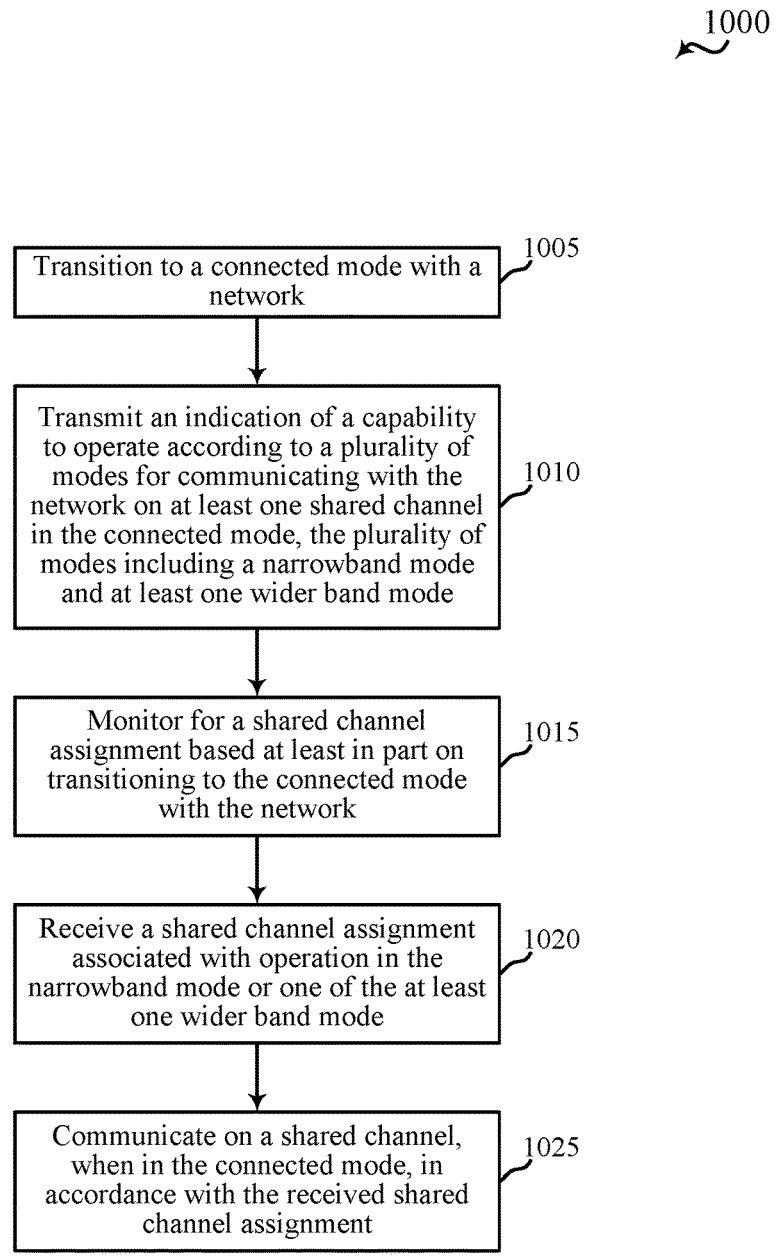
FIG. 10 is a flow chart illustrating an example of a method for wireless communication at a wireless device, in accordance with various aspects of the present disclosure.

FIG. 10 is a flow chart illustrating an example of a method 1000 for wireless communication at a wireless device, in accordance with various aspects of the present disclosure. For clarity, the method 1000 is described below with reference to aspects of one or more of the UEs 115 described with reference to FIG. 1 or 7, aspects of the apparatus 515 described with reference to FIG. 5, or aspects of one or more of the wireless communication managers 520 described with reference to FIG. 5, 6, or 7. In some examples, a wireless device may execute one or more sets of codes to control the functional elements of the wireless device to perform the functions described below. Additionally or alternatively, the wireless device may perform one or more of the functions described below using special-purpose hardware.

At block 1005, the method 1000 may include transitioning to a connected mode with a network. The operation(s) at block 1005 may be performed using the wireless communication manager 520 described with reference to FIG. 5, 6, or 7, or the connection manager 605 described with reference to FIG. 6.

At block 1010, the method 1000 may include transmitting (e.g., to the network) an indication of a capability to operate according to a plurality of modes for communicating with the network on at least one shared channel in the connected mode. The plurality of modes may include a narrowband mode and at least one wider band mode. Each wider band mode may be based at least in part on a shared channel bandwidth between a narrowband shared channel bandwidth associated with the narrowband mode and a wideband shared channel bandwidth associated with a wideband mode, in which the narrowband shared channel bandwidth is different from the wideband shared channel bandwidth. In some examples, transmitting the indication of the capability to operate in the plurality of modes may include transmitting an indication of a maximum supported bandwidth of the wireless device. In some examples, the at least one shared channel may include at least one of a PDSCH, a PUSCH, or a combination thereof. The operation(s) at block 1010 may be performed using the wireless communication manager 520 described with reference to FIG. 5, 6, or 7, or the capability indicator 535 described with reference to FIG. 5 or 6, which may operate in cooperation with a transmitter 530 described with reference to FIG. 5.

At block 1015, the method 1000 may include monitoring for a shared channel assignment based at least in part on transitioning to the connected mode with the network. The operation(s) at block 1015 may be performed using the wireless communication manager 520 described with reference to FIG. 5, 6, or 7, or the shared channel assignment manager 540 described with reference to FIG. 5 or 6, which may operate in cooperation with a receiver 510 described with reference to FIG. 5.

At block 1020, the method 1000 may include receiving a shared channel assignment associated with operation in the narrowband mode or operation in one of the at least one wider band mode. In some examples, monitoring for the shared channel assignment may include at least one of: monitoring at least one wideband grant for the shared channel assignment, in which each wideband grant is associated with the wideband mode; monitoring a subset of RBs allocated to the at least one wideband grant for the shared channel assignment; monitoring at least one wider band grant associated with the at least one wider band mode for the shared channel assignment; monitoring at least one wider band grant associated with a group of narrow bands for the shared channel assignment; or a combination thereof. The operation(s) at block 1020 may be performed using the wireless communication manager 520 described with reference to FIG. 5, 6, or 7, or the shared channel assignment manager 540 described with reference to FIG. 5 or 6, which may operate in cooperation with a receiver 510 described with reference to FIG. 5.

At block 1025, the method 1000 may include communicating on a shared channel, when in the connected mode, in accordance with the received shared channel assignment. The operation(s) at block 1025 may be performed using the wireless communication manager 520 described with reference to FIG. 5, 6, or 7, or the shared channel communication manager 545 described with reference to FIG. 5 or 6, which may operate in cooperation with a receiver 510 and/or a transmitter 530 described with reference to FIG. 5.

Figure 11:
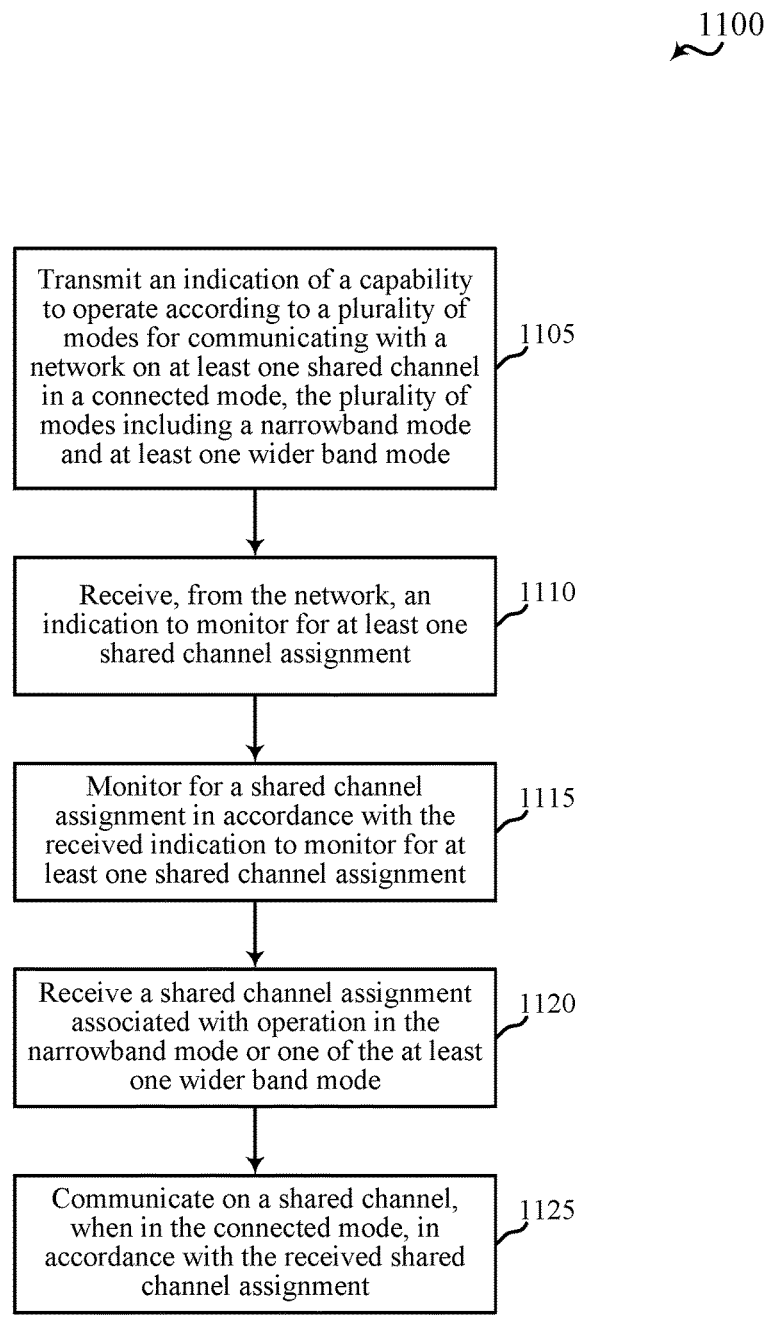
FIG. 11 is a flow chart illustrating an example of a method for wireless communication at a wireless device, in accordance with various aspects of the present disclosure.

FIG. 11 is a flow chart illustrating an example of a method 1100 for wireless communication at a wireless device, in accordance with various aspects of the present disclosure. For clarity, the method 1100 is described below with reference to aspects of one or more of the UEs 115 described with reference to FIG. 1 or 7, aspects of the apparatus 515 described with reference to FIG. 5, or aspects of one or more of the wireless communication managers 520 described with reference to FIG. 5, 6, or 7. In some examples, a wireless device may execute one or more sets of codes to control the functional elements of the wireless device to perform the functions described below. Additionally or alternatively, the wireless device may perform one or more of the functions described below using special-purpose hardware.

At block 1105, the method 1100 may include transmitting an indication of a capability to operate in a plurality of modes when communicating with a network on at least one shared channel in a connected mode. The plurality of modes may include a narrowband mode and at least one wider band mode. Each wider band mode may be based at least in part on a shared channel bandwidth between a narrowband shared channel bandwidth associated with the narrowband mode and a wideband shared channel bandwidth associated with a wideband mode, in which the narrowband shared channel bandwidth is different from the wideband shared channel bandwidth. In some examples, transmitting the indication of the capability to operate according to the plurality of modes may include transmitting an indication of a maximum supported bandwidth of the wireless device. In some examples, the at least one shared channel may include at least one of a PDSCH, a PUSCH, or a combination thereof. The operation(s) at block 1105 may be performed using the wireless communication manager 520 described with reference to FIG. 5, 6, or 7, or the capability indicator 535 described with reference to FIG. 5 or 6, which may operate in cooperation with a transmitter 530 described with reference to FIG. 5.

At block 1110, the method 1100 may include receiving, from the network, an indication to monitor for at least one shared channel assignment. The operation(s) at block 1110 may be performed using the wireless communication manager 520 described with reference to FIG. 5, 6, or 7, or the shared channel assignment manager 540 described with reference to FIG. 5 or 6, which may operate in cooperation with a receiver 510 described with reference to FIG. 5.

At 1115, the method 1100 may include monitoring for a shared channel assignment in accordance with the indication received at block 1110. The operation(s) at block 1115 may be performed using the wireless communication manager 520 described with reference to FIG. 5, 6, or 7, or the shared channel assignment manager 540 described with reference to FIG. 5 or 6, which may operate in cooperation with a receiver 510 described with reference to FIG. 5.

At block 1120, the method 1100 may include receiving a shared channel assignment associated with operation in the narrowband mode or operation in one of the at least one wider band mode. In some examples, monitoring for the shared channel assignment may include at least one of: monitoring at least one wideband grant for the shared channel assignment, in which each wideband grant is associated with the wideband mode; monitoring a subset of RBs allocated to the at least one wideband grant for the shared channel assignment; monitoring at least one wider band grant associated with the at least one wider band mode for the shared channel assignment; monitoring at least one wider band grant associated with a group of narrow bands for the shared channel assignment; or a combination thereof. The operation(s) at block 1120 may be performed using the wireless communication manager 520 described with reference to FIG. 5, 6, or 7, or the shared channel assignment manager 540 described with reference to FIG. 5 or 6, which may operate in cooperation with a receiver 510 described with reference to FIG. 5.

At block 1125, the method 1100 may include communicating on a shared channel, when in the connected mode, in accordance with the received shared channel assignment. The operation(s) at block 1125 may be performed using the wireless communication manager 520 described with reference to FIG. 5, 6, or 7, or the shared channel communication manager 545 described with reference to FIG. 5 or 6, which may operate in cooperation with a receiver 510 and/or a transmitter 530 described with reference to FIG. 5.

Figure 12:
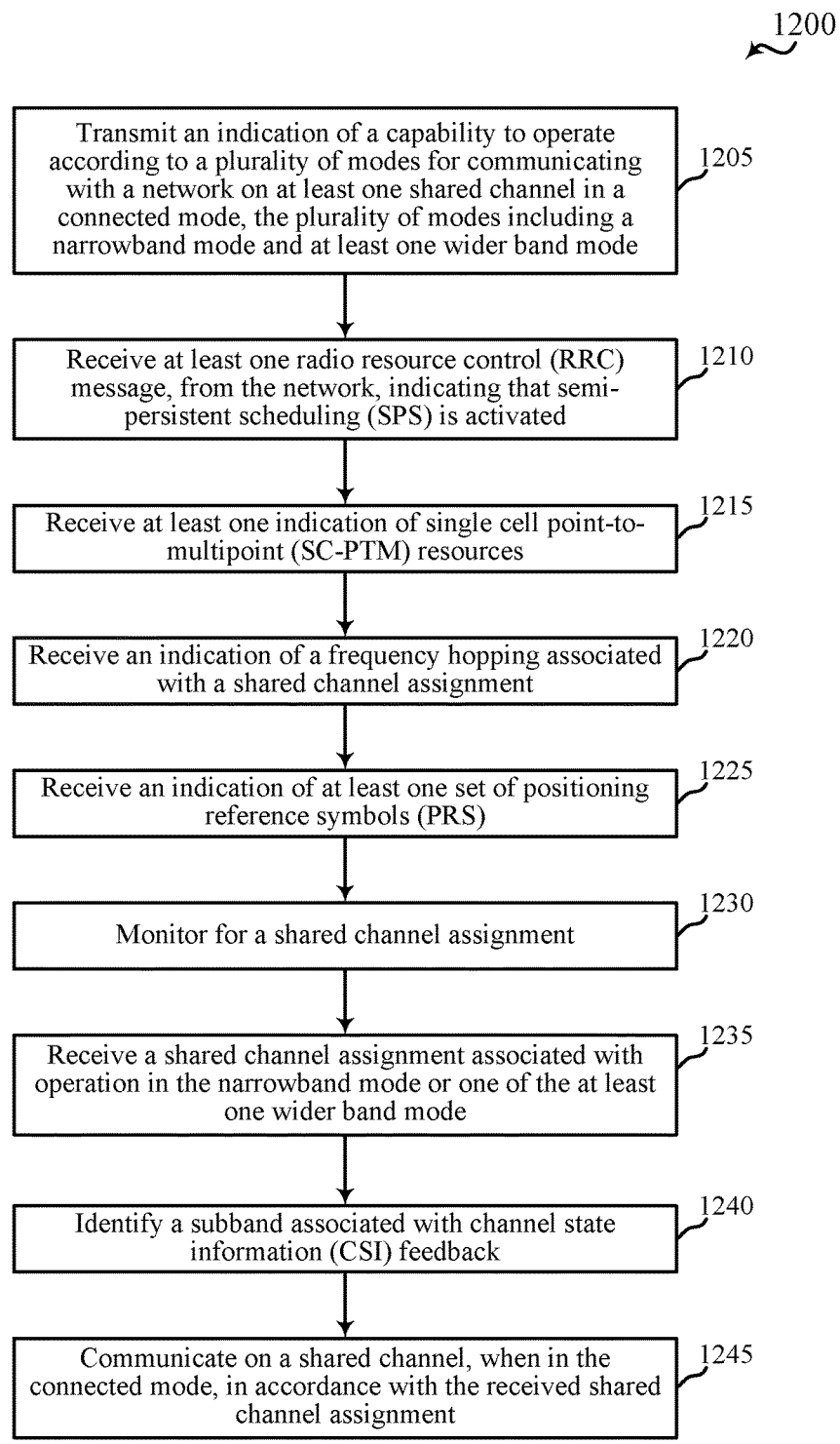
FIG. 12 is a flow chart illustrating an example of a method for wireless communication at a wireless device, in accordance with various aspects of the present disclosure.

FIG. 12 is a flow chart illustrating an example of a method 1200 for wireless communication at a wireless device, in accordance with various aspects of the present disclosure. For clarity, the method 1200 is described below with reference to aspects of one or more of the UEs 115 described with reference to FIG. 1 or 7, aspects of the apparatus 515 described with reference to FIG. 5, or aspects of one or more of the wireless communication managers 520 described with reference to FIG. 5, 6, or 7. In some examples, a wireless device may execute one or more sets of codes to control the functional elements of the wireless device to perform the functions described below. Additionally or alternatively, the wireless device may perform one or more of the functions described below using special-purpose hardware.

At block 1205, the method 1200 may include transmitting an indication of a capability to operate according to a plurality of modes for communicating with a network on at least one shared channel in a connected mode. The plurality of modes may include a narrowband mode and at least one wider band mode. Each wider band mode may be based at least in part on a shared channel bandwidth between a narrowband shared channel bandwidth associated with the narrowband mode and a wideband shared channel bandwidth associated with a wideband mode, in which the narrowband shared channel bandwidth is different from the wideband shared channel bandwidth. In some examples, transmitting the indication of the capability to operate according to the plurality of modes may include transmitting an indication of a maximum supported bandwidth of the wireless device. In some examples, the at least one shared channel may include at least one of a PDSCH, a PUSCH, or a combination thereof. The operation(s) at block 1205 may be performed using the wireless communication manager 520 described with reference to FIG. 5, 6, or 7, or the capability indicator 535 described with reference to FIG. 5 or 6, which may operate in cooperation with a transmitter 530 described with reference to FIG. 5.

At block 1210, the method 1200 may include receiving at least one RRC message from the network. In some examples, a received RRC message may indicate that SPS is activated for a mode of the plurality of modes. In some examples, a received RRC message may just indicate that SPS is activated, and the method 1200 may include identifying a mode of the plurality of modes for which the SPS is activated based at least in part on the maximum supported bandwidth of the wireless device, or based at least in part on a mode associated with a shared channel assignment received at block 1235. The operation(s) at block 1210 may be performed using the wireless communication manager 520 described with reference to FIG. 5, 6, or 7, or the SPS manager 610 described with reference to FIG. 6, which may operate in cooperation with a receiver 510 described with reference to FIG. 5.

At block 1215, the method 1200 may optionally include receiving at least one indication of SC-PTM resources. In some examples, the at least one indication of SC-PTM resources may be received with system information (e.g., in at least one SIB). In some examples, the operation(s) at block 1215 may be a part of the operation(s) at block 1210. In some examples, the operation(s) at block 1215 may include receiving at least one indication of SC-PTM resources in at least one SIB that identifies a first set of SC-PTM resources associated with the narrowband mode, and a second set of SC-PTM resources associated with at least a first wider band mode. In some examples, the operation(s) at block 1215 may also include receiving, in the at least one SIB, a first indication of a first TBS associated with the first set of SC-PTM resources associated with the narrowband mode, and a second indication of a second TBS associated with the second set of SC-PTM resources associated with the first wider band mode. The operation(s) at block 1215 may be performed using the wireless communication manager 520 described with reference to FIG. 5, 6, or 7, or the SC-PTM manager 615 described with reference to FIG. 6, which may operate in cooperation with a receiver 510 described with reference to FIG. 5.

At block 1220, the method 1200 may optionally include receiving an indication of a frequency hopping associated with a shared channel assignment. The indication of the frequency hopping may include at least one of: a frequency hopping offset based at least in part on a wider band associated with a wider band mode, a frequency hopping offset based at least in part on a number of resource blocks, an indication to use mirror hopping, an indication to use slot-based hopping for an uplink communication, or an indication to not use frequency hopping. In some examples, the indication of the frequency hopping associated with the shared channel assignment may be received in a SIB received at block 1210 or 1215. The operation(s) at block 1220 may be performed using the wireless communication manager 520 described with reference to FIG. 5, 6, or 7, or the frequency hopping manager 620 described with reference to FIG. 6, which may operate in cooperation with a receiver 510 described with reference to FIG. 5.

At block 1225, the method 1200 may optionally include receiving an indication of at least one of: a first set of PRS for the narrowband mode, a second set of PRS for at least a first wider band mode, or a combination thereof. In some examples, the indication(s) of the set(s) of PRS may be received in a SIB received at block 1210 or 1215. The operation(s) at block 1225 may be performed using the wireless communication manager 520 described with reference to FIG. 5, 6, or 7, or the PRS manager 625 described with reference to FIG. 6, which may operate in cooperation with a receiver 510 described with reference to FIG. 5.

At 1230, the method 1200 may include monitoring for a shared channel assignment in: narrowband grants and at least one of wider band grants or wideband grants, or narrowband grants in a common search space and at least one of wider band grants or wideband grants in a device-specific search space, or at least one of wider band grants or wideband grants. The operation(s) at block 1230 may be performed using the wireless communication manager 520 described with reference to FIG. 5, 6, or 7, or the shared channel assignment manager 540 described with reference to FIG. 5 or 6, which may operate in cooperation with a receiver 510 described with reference to FIG. 5.

At block 1235, the method 1200 may include receiving a shared channel assignment associated with operation in the narrowband mode or operation in one of the at least one wider band mode. In some examples, receiving the shared channel assignment may include receiving at least one of: an indication of a non-contiguous resource allocation for a downlink communication, or an indication of a multi-cluster resource allocation for an uplink communication. In some examples, receiving the shared channel assignment may include receiving, in a MPDCCH, a first indication of a first TBS associated with the first set of SC-PTM resources associated with the narrowband mode, or a second indication of a second TBS associated with the second set of SC-PTM resources associated with the first wider band mode. The operation(s) at block 1235 may be performed using the wireless communication manager 520 described with reference to FIG. 5, 6, or 7, or the shared channel assignment manager 540 described with reference to FIG. 5 or 6, which may operate in cooperation with a receiver 510 described with reference to FIG. 5.

At block 1240, the method 1200 may optionally include identifying a subband associated with CSI feedback. In some examples, the subband may include a narrow band used for transmission of a MPDCCH (e.g., according to a narrowband control channel bandwidth), but the subband may have a greater bandwidth than the narrow band used for the MPDCCH. In some examples, the subband may have a third bandwidth between the narrowband shared channel bandwidth of the narrowband mode and the wideband shared channel bandwidth of the wideband mode. The operation(s) at block 1240 may be performed using the wireless communication manager 520 described with reference to FIG. 5, 6, or 7, or the CSI manager 630 described with reference to FIG. 6.

At block 1245, the method 1200 may include communicating on a shared channel, when in the connected mode, in accordance with the shared channel assignment. In some examples, communicating on the shared channel may include transmitting CSI feedback for the subband identified at block 1240 (e.g., when communicating in a first wider band mode). In some examples, communicating on the shared channel may include transmitting CSI feedback for a narrow band used for transmission of a MPDCCH (e.g., when communicating in the narrowband mode). In some examples, CSI feedback may alternatively be transmitted on a control channel (e.g., on a MPDCCH or PUCCH). In some examples, the communicating may be based at least in part on a retuning from a first band to a second band, and the operation(s) at block 1245 may further include transmitting a SRS when the first band and the second band are within a maximum supported bandwidth of the wireless device. The operation(s) at block 1245 may be performed using the wireless communication manager 520 described with reference to FIG. 5, 6, or 7, the shared channel communication manager 545 described with reference to FIG. 5 or 6, or the CSI manager 630 or SRS manager 635 described with reference to FIG. 6, which may operate in cooperation with a receiver 510 and/or a transmitter 530 described with reference to FIG. 5.

The methods 900, 1000, 1100, and 1200 described with reference to FIGS. 9, 10, 11, and 12 may provide for wireless communication. It should be noted that the methods 900, 1000, 1100, and 1200 are just example implementations, and the operations of the method 900, 1000, 1100, or 1200 may be rearranged or otherwise modified such that other implementations are possible. In some examples, aspects of the methods 900, 1000, 1100, or 1200 may be combined.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM, flash memory, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for machine type communication at a wireless device, comprising:
    transmitting an indication of a capability to operate according to a plurality of modes for communicating with a network on at least one shared channel in a connected mode, the plurality of modes including a narrowband mode and at least one wider band mode, wherein each wider band mode is based at least on a shared channel bandwidth between a narrowband shared channel bandwidth associated with the narrowband mode and a wideband shared channel bandwidth associated with a wideband mode, the narrowband shared channel bandwidth being different from the wideband shared channel bandwidth;
    monitoring for shared channel assignments associated with operation in one or more of the plurality of modes in: narrowband grants and at least one of wider band grants or wideband grants, or narrowband grants in a common search space and at least one of wider band grants or wideband grants in a device-specific search space;
    receiving a shared channel assignment based at least on the monitoring, wherein the received shared channel assignment is associated with operation in the narrowband mode or one of the at least one wider band mode; and
    communicating on a shared channel, when in the connected mode, in accordance with the received shared channel assignment.

2. The method of claim 1, further comprising:
    transitioning to the connected mode with the network; and
    monitoring for the shared channel assignment based at least on transitioning to the connected mode with the network.

3. The method of claim 2, wherein the monitoring for the shared channel assignment comprises at least one of:
    monitoring at least one wideband grant for the shared channel assignment, wherein each wideband grant is associated with the wideband mode; monitoring a subset of resource blocks allocated to the at least one wideband grant for the shared channel assignment; monitoring at least one wider band grant associated with the at least one wider band mode for the shared channel assignment; monitoring at least one wider band grant associated with a group of narrow bands for the shared channel assignment; or a combination thereof.

4. The method of claim 1, further comprising:
    receiving, from the network, an indication to monitor for at least one shared channel assignment; and
    monitoring for the shared channel assignment in accordance with the received indication to monitor for the at least one shared channel assignment.

5. The method of claim 4, wherein the monitoring for the shared channel assignment comprises at least one of:
    monitoring at least one wideband grant for the shared channel assignment, wherein each wideband grant is associated with the wideband mode; monitoring a subset of resource blocks allocated to the at least one wideband grant for the shared channel assignment; monitoring at least one wider band grant associated with the at least one wider band mode for the shared channel assignment; monitoring at least one wider band grant associated with a group of narrow bands for the shared channel assignment; or a combination thereof.

6. The method of claim 1, wherein the indicated capability to operate according to a plurality of modes for communicating with a network on at least one shared channel in a connected mode comprises an indication of a maximum supported bandwidth of the wireless device, and wherein the shared channel assignment is associated with a mode having a shared channel bandwidth that is less than or equal to the maximum supported bandwidth of the wireless device.

7. The method of claim 1, wherein the receiving and the communicating occur cross-subframe.

8. The method of claim 1, further comprising:
    receiving an indication of a frequency hopping associated with the shared channel assignment, the indication of the frequency hopping including at least one of: a frequency hopping offset based at least on a wider band associated with a wider band mode, a frequency hopping offset based at least on a number of resource blocks, an indication to use mirror hopping, an indication to use slot-based hopping for an uplink communication, or an indication to not use frequency hopping.

9. The method of claim 1, further comprising:
    receiving at least one of: an indication of a non-contiguous resource allocation for a downlink communication, or an indication of a multi-cluster resource allocation for an uplink communication.

10. The method of claim 1, further comprising:
    receiving a radio resource control (RRC) message indicating that semi-persistent scheduling (SPS) is activated for a mode of the plurality of modes.

11. The method of claim 1, further comprising:
    receiving a radio resource control (RRC) message indicating that semi-persistent scheduling (SPS) is activated; and
    identifying a mode of the plurality of modes for which the SPS is activated based at least on: a maximum supported bandwidth of the wireless device, or the mode associated with the shared channel assignment.

12. The method of claim 1, further comprising:
    identifying a subband including a narrow band used for transmission of a machine type communication (MTC) physical downlink control channel (MPDCCH), the subband having a greater bandwidth than the narrow band used for the MPDCCH; and transmitting channel state information (CSI) feedback for the identified subband when communicating in one of the at least one wider band mode.

13. The method of claim 1, further comprising:
identifying a subband associated with channel state information (CSI) feedback, the subband having a bandwidth between the narrowband shared channel bandwidth and the wideband shared channel bandwidth; and
transmitting CSI feedback for the identified subband when communicating in one of the at least one wider band mode.

14. The method of claim 1, further comprising:
receiving a system information block that identifies a first set of single cell point-to-multipoint (SC-PTM) resources associated with the narrowband mode, and a second set of SC-PTM resources associated with at least a first wider band mode of the at least one wider band mode.

15. The method of claim 14, further comprising:
receiving, in the system information block, a first indication of a first transport block size (TBS) associated with the first set of SC-PTM resources associated with the narrowband mode, and a second indication of a second TB S associated with the second set of SC-PTM resources associated with the first wider band mode.

16. The method of claim 14, further comprising:
receiving, in a machine type communication (MTC) physical downlink control channel (MPDCCH), a first indication of a first transport block size (TBS) associated with the first set of SC-PTM resources associated with the narrowband mode, or a second indication of a second TBS associated with the second set of SC-PTM resources associated with the first wider band mode.

17. The method of claim 1, further comprising:
receiving an indication of at least one of: a first set of positioning reference symbols (PRS) for the narrowband mode, a second set of PRS for at least a first wider band mode of the at least one wider band mode, or a combination thereof.

18. The method of claim 1, wherein the communicating is based at least on a retuning from a first band to a second band, the method further comprising:
transmitting a sounding reference signal (SRS) when the first band and the second band are within a maximum supported bandwidth of the wireless device.

19. The method of claim 1, wherein the at least one wider band mode comprises:
a single wider band mode or a plurality of wider band modes.

20. The method of claim 1, wherein the at least one wider band mode comprises a first wider band mode and a second wider band mode, and wherein the first wider band mode is based at least on a different shared channel bandwidth than the second wider band mode.

21. The method of claim 1, wherein the at least one wider band mode comprises:
a wider band downlink shared channel bandwidth; and
a wider band uplink shared channel bandwidth that is different from the wider band downlink shared channel bandwidth.

22. The method of claim 1, wherein transmitting the indication of the capability to operate in the plurality of modes comprises:
transmitting an indication of a maximum supported bandwidth of the wireless device.

23. The method of claim 1, wherein the at least one shared channel comprises at least one of:
a physical downlink shared channel (PDSCH), a physical uplink shared channel (PUSCH), or a combination thereof.

24. An apparatus for machine type communication at a wireless device, comprising:
a processor; and
a memory in electronic communication with the processor;
the processor and the memory configured to:
transmit an indication of a capability to operate according to a plurality of modes for communicating with a network on at least one shared channel in a connected mode, the plurality of modes including a narrowband mode and at least one wider band mode, wherein each wider band mode is based at least on a shared channel bandwidth between a narrowband shared channel bandwidth associated with the narrowband mode and a wideband shared channel bandwidth associated with a wideband mode, the narrowband shared channel bandwidth being different from the wideband shared channel bandwidth;
monitor for shared channel assignments associated with operation in one or more of the plurality of modes in: narrowband grants and at least one of wider band grants or wideband grants, or narrowband grants in a common search space and at least one of wider band grants or wideband grants in a device-specific search space;
receive a shared channel assignment based at least on the monitoring, wherein the received shared channel assignment is associated with operation in the narrowband mode or one of the at least one wider band mode; and
communicate on a shared channel, when in the connected mode, in accordance with the received shared channel assignment.

25. The apparatus of claim 24, wherein the processor and memory are configured to:
transition to the connected mode with the network; and
monitor for the shared channel assignment based at least on transitioning to the connected mode with the network.

26. The apparatus of claim 25, wherein monitoring for the shared channel assignment comprises at least one of the processor and memory being configured to:
monitor at least one wideband grant for the shared channel assignment, wherein each wideband grant is associated with the wideband mode; monitor a subset of resource blocks allocated to the at least one wideband grant for the shared channel assignment; monitor at least one wider band grant associated with the at least one wider band mode for the shared channel assignment; monitor at least one wider band grant associated with a group of narrow bands for the shared channel assignment; or a combination thereof.

27. The apparatus of claim 24, wherein the processor and memory are configured to:
receive, from the network, an indication to monitor for at least one shared channel assignment; and
monitor for the shared channel assignment in accordance with the received indication to monitor for the at least one shared channel assignment.

28. The apparatus of claim 27, wherein monitoring for the shared channel assignment comprises at least one of the processor and memory being configured to:
monitor at least one wideband grant for the shared channel assignment, wherein each wideband grant is associated with the wideband mode; monitor a subset of resource blocks allocated to the at least one wideband grant for the shared channel assignment; monitor at least one wider band grant associated with the at least one wider band mode for the shared channel assignment; monitor at least one wider band grant associated with a group of narrow bands for the shared channel assignment; or a combination thereof.

29. The apparatus of claim 24, wherein the indicated capability to operate according to a plurality of modes for communicating with a network on at least one shared channel in a connected mode comprises an indication of a maximum supported bandwidth of the wireless device, and wherein the shared channel assignment is associated with a mode having a shared channel bandwidth that is less than or equal to the maximum supported bandwidth of the wireless device.

30. The apparatus of claim 24, wherein the receiving and the communicating occur cross-subframe.

31. The apparatus of claim 24, wherein the processor and memory are configured to:
receive an indication of a frequency hopping associated with the shared channel assignment, the indication of the frequency hopping including at least one of: a frequency hopping offset based at least on a wider band associated with a wider band mode, a frequency hopping offset based at least on a number of resource blocks, an indication to use mirror hopping, an indication to use slot-based hopping for an uplink communication, or an indication to not use frequency hopping.

32. The apparatus of claim 24, wherein the processor and memory are configured to:
receive at least one of: an indication of a non-contiguous resource allocation for a downlink communication, or an indication of a multi-cluster resource allocation for an uplink communication.

33. The apparatus of claim 24, wherein the processor and memory are configured to:
receive a radio resource control (RRC) message indicating that semi-persistent scheduling (SPS) is activated for a mode of the plurality of modes.

34. The apparatus of claim 24, wherein the processor and memory are configured to:
receive a radio resource control (RRC) message indicating that semi-persistent scheduling (SPS) is activated; and
identify a mode of the plurality of modes for which the SPS is activated based at least on: a maximum supported bandwidth of the wireless device, or the mode associated with the shared channel assignment.

35. The apparatus of claim 24, wherein the processor and memory are configured to:
identify a subband including a narrow band used for transmission of a machine type communication (MTC) physical downlink control channel (MPDCCH), the subband having a greater bandwidth than the narrow band used for the MPDCCH; and
transmit channel state information (CSI) feedback for the identified subband when communicating in one of the at least one wider band mode.

36. The apparatus of claim 24, wherein the processor and memory are configured to:
identify a subband associated with channel state information (CSI) feedback, the subband having a bandwidth between the narrowband shared channel bandwidth and the wideband shared channel bandwidth; and
transmit CSI feedback for the identified subband when communicating in one of the at least one wider band mode.

37. The apparatus of claim 24, wherein the processor and memory are configured to:
receive a system information block that identifies a first set of single cell point-to-multipoint (SC-PTM) resources associated with the narrowband mode, and a second set of SC-PTM resources associated with at least a first wider band mode of the at least one wider band mode.

38. The apparatus of claim 37, wherein the processor and memory are configured to:
receive, in the system information block, a first indication of a first transport block size (TBS) associated with the first set of SC-PTM resources associated with the narrowband mode, and a second indication of a second TBS associated with the second set of SC-PTM resources associated with the first wider band mode.

39. The apparatus of claim 37, wherein the processor and memory are configured to:
receive, in a machine type communication (MTC) physical downlink control channel (MPDCCH), a first indication of a first transport block size (TBS) associated with the first set of SC-PTM resources associated with the narrowband mode, or a second indication of a second TBS associated with the second set of SC-PTM resources associated with the first wider band mode.

40. The apparatus of claim 24, wherein the processor and memory are configured to:
receive an indication of at least one of: a first set of positioning reference symbols (PRS) for the narrowband mode, a second set of PRS for at least a first wider band mode of the at least one wider band mode, or a combination thereof.

41. The apparatus of claim 24, wherein the communicating is based at least on a retuning from a first band to a second band, wherein the processor and memory are configured to:
transmit a sounding reference signal (SRS) when the first band and the second band are within a maximum supported bandwidth of the wireless device.

42. The apparatus of claim 24, wherein the at least one wider band mode comprises:
a single wider band mode or a plurality of wider band modes.

43. The apparatus of claim 24, wherein the at least one wider band mode comprises a first wider band mode and a second wider band mode, and wherein the first wider band mode is based at least on a different shared channel bandwidth than the second wider band mode.

44. The apparatus of claim 24, wherein the at least one wider band mode comprises:
a wider band downlink shared channel bandwidth; and
a wider band uplink shared channel bandwidth that is different from the wider band downlink shared channel bandwidth.

45. The apparatus of claim 24, wherein transmitting the indication of the capability to operate according to a plurality of modes comprises the processor and memory being configured to:
transmit an indication of a maximum supported bandwidth of the wireless device.

46. The apparatus of claim 24, wherein the at least one shared channel comprises at least one of:

a physical downlink shared channel (PDSCH), a physical uplink shared channel (PUSCH), or a combination thereof.

47. An apparatus for machine type communication at a wireless device, comprising:
  means for transmitting an indication of a capability to operate according to a plurality of modes for communicating with a network on at least one shared channel in a connected mode, the plurality of modes including a narrowband mode and at least one wider band mode, wherein each wider band mode is based at least on a shared channel bandwidth between a narrowband shared channel bandwidth associated with the narrowband mode and a wideband shared channel bandwidth associated with a wideband mode, the narrowband shared channel bandwidth being different from the wideband shared channel bandwidth;
  means for monitoring for shared channel assignments associated with operation in one or more of the plurality of modes in: narrowband grants and at least one of wider band grants or wideband grants, or narrowband grants in a common search space and at least one of wider band grants or wideband grants in a device-specific search space;
  means for receiving a shared channel assignment based at least on the monitoring, wherein the received shared channel assignment is associated with operation in the narrowband mode or one of the at least one wider band mode; and
  means for communicating on a shared channel, when in the connected mode, in accordance with the received shared channel assignment.

48. The apparatus of claim 47, further comprising:
  means for transitioning to the connected mode with the network; and
  means for monitoring for the shared channel assignment based at least on transitioning to the connected mode with the network.

49. The apparatus of claim 48, wherein the means for monitoring for the shared channel assignment comprises at least one of:
  means for monitoring at least one wideband grant for the shared channel assignment, wherein each wideband grant is associated with the wideband mode; means for monitoring a subset of resource blocks allocated to the at least one wideband grant for the shared channel assignment; means for monitoring at least one wider band grant associated with the at least one wider band mode for the shared channel assignment; means for monitoring at least one wider band grant associated with a group of narrow bands for the shared channel assignment; or a combination thereof.

50. The apparatus of claim 47, further comprising:
  means for receiving, from the network, an indication to monitor for at least one shared channel assignment; and
  means for monitoring for the shared channel assignment in accordance with the received indication to monitor for the at least one shared channel assignment.

51. The apparatus of claim 50, wherein the means for monitoring for the shared channel assignment comprises at least one of:
  means for monitoring at least one wideband grant for the shared channel assignment, wherein each wideband grant is associated with the wideband mode; means for monitoring a subset of resource blocks allocated to the at least one wideband grant for the shared channel assignment; means for monitoring at least one wider band grant associated with the at least one wider band mode for the shared channel assignment; means for monitoring at least one wider band grant associated with a group of narrow bands for the shared channel assignment; or a combination thereof.

52. A non-transitory computer-readable medium storing computer-executable code for machine type wireless communication at a wireless device, the code executable by a processor to:
  transmit an indication of a capability to operate according to a plurality of modes for communicating with a network on at least one shared channel in a connected mode, the plurality of modes including a narrowband mode and at least one wider band mode, wherein each wider band mode is based at least on a shared channel bandwidth between a narrowband shared channel bandwidth associated with the narrowband mode and a wideband shared channel bandwidth associated with a wideband mode, the narrowband shared channel bandwidth being different from the wideband shared channel bandwidth;
  monitor for shared channel assignments associated with operation in one or more of the plurality of modes in: narrowband grants and at least one of wider band grants or wideband grants, or narrowband grants in a common search space and at least one of wider band grants or wideband grants in a device-specific search space;
  receive a shared channel assignment based at least on the monitoring, wherein the received shared channel assignment is associated with operation in the narrowband mode or one of the at least one wider band mode; and
  communicate on a shared channel, when in the connected mode, in accordance with the received shared channel assignment.

53. The non-transitory computer-readable medium of claim 52, wherein the code is executable by the processor to:
  transition to the connected mode with the network; and
  monitor for the shared channel assignment based at least on transitioning to the connected mode with the network.

54. The non-transitory computer-readable medium of claim 52, wherein the code is executable by the processor to:
  receive, from the network, an indication to monitor for at least one shared channel assignment; and
  monitor for the shared channel assignment in accordance with the received indication to monitor for the at least one shared channel assignment.

* * * * *